US009866805B2

(12) United States Patent
Bechtel et al.

(10) Patent No.: US 9,866,805 B2
(45) Date of Patent: Jan. 9, 2018

(54) DIGITAL IMAGE PROCESSING AND SYSTEMS INCORPORATING THE SAME

(75) Inventors: Jon H. Bechtel, Holland, MI (US); Jeremy C. Andrus, Zeeland, MI (US); Tom B. Sherman, Ada, MI (US)

(73) Assignee: GENTEX CORPORATION, Zeeland, MI (US)

( * ) Notice: Subject to any disclaimer, the term of this patent is extended or adjusted under 35 U.S.C. 154(b) by 727 days.

(21) Appl. No.: 12/697,600

(22) Filed: Feb. 1, 2010

(65) Prior Publication Data

US 2010/0195908 A1 Aug. 5, 2010

Related U.S. Application Data

(60) Provisional application No. 61/149,049, filed on Feb. 2, 2009, provisional application No. 61/155,691, filed on Feb. 26, 2009, provisional application No. 61/181,770, filed on May 28, 2009, provisional application No. 61/222,532, filed on Jul. 2, 2009.

(51) Int. Cl.
| | |
|---|---|
| *H04N 9/04* | (2006.01) |
| *H04N 5/213* | (2006.01) |
| *H04N 5/235* | (2006.01) |
| *H04N 5/57* | (2006.01) |
| *H04N 21/431* | (2011.01) |

(52) U.S. Cl.
CPC .............. *H04N 9/045* (2013.01); *H04N 5/213* (2013.01); *H04N 5/2355* (2013.01); *H04N 5/57* (2013.01); *H04N 21/4318* (2013.01)

(58) Field of Classification Search
CPC ........... G06T 5/001; G06T 5/40; H04N 9/045; H04N 1/6027; H04N 1/60; H04N 1/4092; H04N 1/409
USPC ................................................... 382/167, 300
See application file for complete search history.

(56) References Cited

U.S. PATENT DOCUMENTS

| | | | |
|---|---|---|---|
| 4,630,307 | A | 12/1986 | Cok |
| 5,717,791 | A | 2/1998 | Labaere et al. |
| 5,805,217 | A | 9/1998 | Lu et al. |
| 6,396,505 | B1 | 5/2002 | Lui et al. |
| 6,466,333 | B1 | 10/2002 | Schoolcraft et al. |
| 6,628,330 | B1 * | 9/2003 | Lin ............................... 348/252 |
| 6,993,200 | B2 | 1/2006 | Tastl et al. |
| 7,010,174 | B2 | 3/2006 | Kang et al. |
| 7,103,260 | B1 | 9/2006 | Hinson |
| 7,142,723 | B2 | 11/2006 | Kang et al. |
| 7,146,059 | B1 | 12/2006 | Durand et al. |
| 7,236,628 | B2 * | 6/2007 | Chen et al. ..................... 382/167 |
| 7,239,757 | B2 | 7/2007 | Kang et al. |
| 7,317,843 | B2 | 1/2008 | Sun et al. |

(Continued)

OTHER PUBLICATIONS

Patent Cooperation Treaty, Notification Concerning Transmittal of International Preliminary Report on Patentability, Aug. 11, 2011, 9 pages.

(Continued)

*Primary Examiner* — Twyler Haskins
*Assistant Examiner* — Fayez Bhuiyan
(74) *Attorney, Agent, or Firm* — Price Heneveld LLP; Bradley D. Johnson

(57) ABSTRACT

A spectrally mosaiced digital image is provided with missing color data imputed for each pixel. Circuitry is provided that is configured to perform at least a portion of the calculations related to demosaicing a high dynamic range image.

23 Claims, 18 Drawing Sheets

(56) References Cited

U.S. PATENT DOCUMENTS

| | | | |
|---|---|---|---|
| 7,362,897 B2* | 4/2008 | Ishiga | 382/167 |
| 7,376,288 B2 | 5/2008 | Huang et al. | |
| 7,454,136 B2 | 11/2008 | Raskar et al. | |
| 7,492,375 B2 | 2/2009 | Toyama et al. | |
| 7,502,505 B2 | 3/2009 | Malvar et al. | |
| 7,519,907 B2 | 4/2009 | Cohen et al. | |
| 7,783,121 B1 | 8/2010 | Cox | |
| 7,889,949 B2 | 2/2011 | Cohen et al. | |
| RE43,357 E * | 5/2012 | Lin | 348/252 |
| 8,196,839 B2* | 6/2012 | Wang | 235/472.01 |
| 2003/0206179 A1* | 11/2003 | Deering | 345/589 |
| 2003/0218621 A1* | 11/2003 | Jiang | 345/698 |
| 2005/0135700 A1* | 6/2005 | Anderson | 382/261 |
| 2005/0200733 A1 | 9/2005 | Malvar | |
| 2006/0104505 A1* | 5/2006 | Chen et al. | 382/162 |
| 2007/0110300 A1* | 5/2007 | Chang et al. | 382/162 |
| 2007/0285432 A1* | 12/2007 | Stewart | 345/581 |
| 2008/0046150 A1* | 2/2008 | Breed | 701/45 |
| 2008/0192819 A1 | 8/2008 | Ward et al. | |
| 2008/0278602 A1* | 11/2008 | Otsu | 348/223.1 |
| 2009/0091645 A1* | 4/2009 | Trimeche et al. | 348/273 |
| 2009/0092284 A1* | 4/2009 | Breed et al. | 382/103 |
| 2010/0177203 A1 | 7/2010 | Lin | |
| 2010/0231745 A1* | 9/2010 | Li et al. | 348/223.1 |
| 2011/0285982 A1* | 11/2011 | Breed | 356/4.01 |

OTHER PUBLICATIONS

C.Tomasi & R. Manduchi, Bilateral Filtering for Gray and Color Images, Proceedings of the 1998 IEEE International on Computer Vision, Bombay, India, Conference.

* cited by examiner

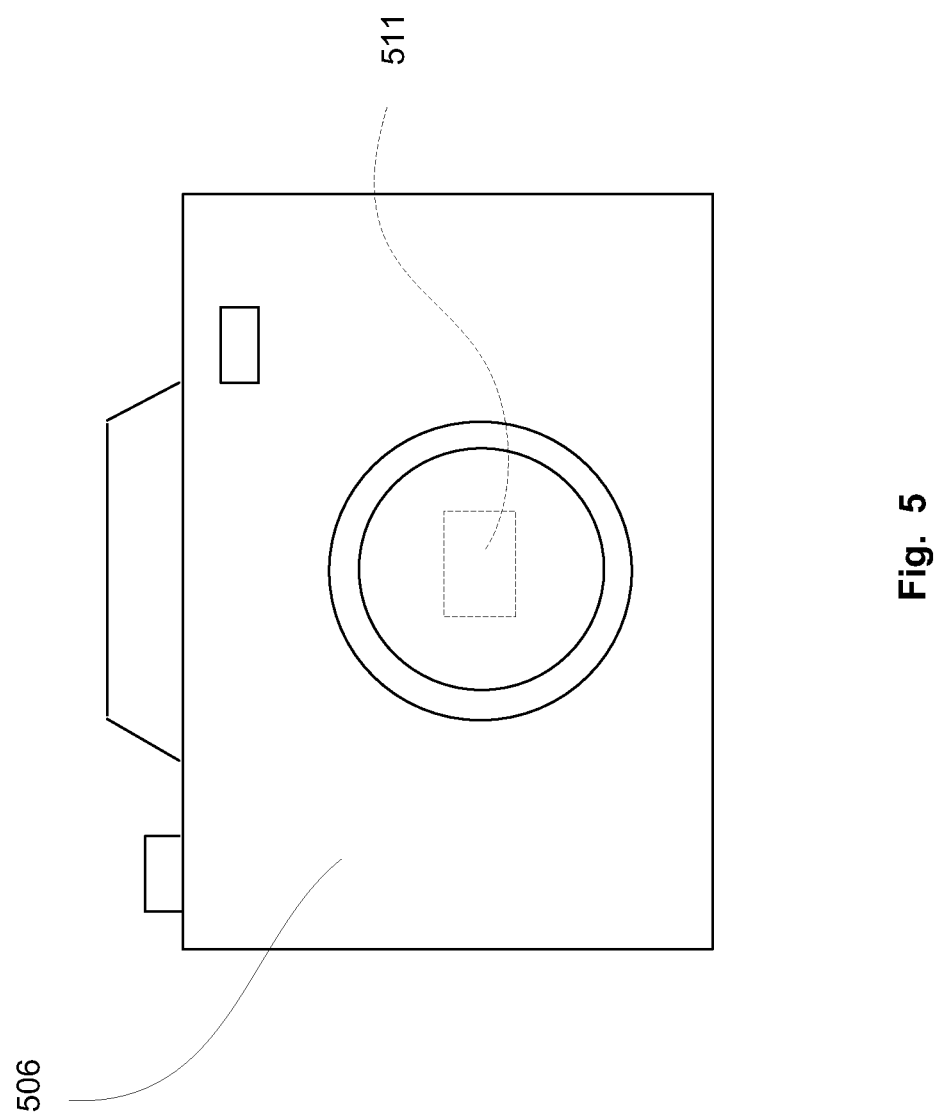

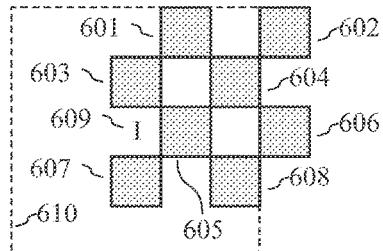
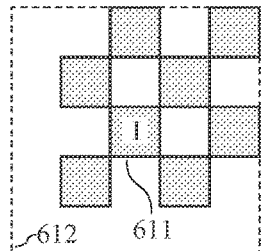
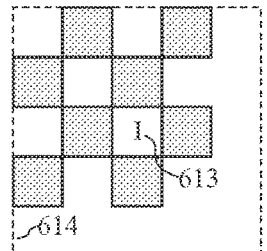
Fig. 6a  
KEY: 01111001  
DECODE: Non-dir
Fig. 6b  
KEY: 00001100  
DECODE: Hor
Fig. 6c  
KEY: 10101010  
DECODE: Vert
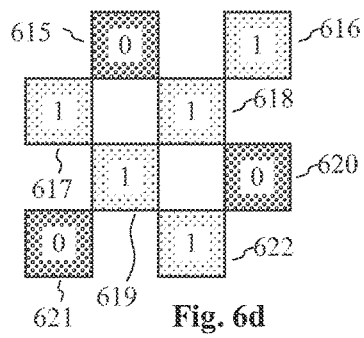
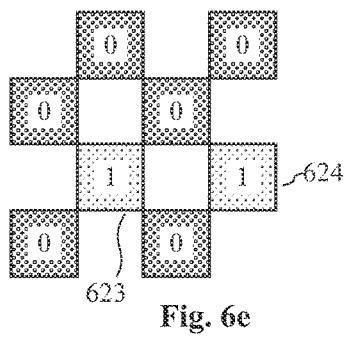
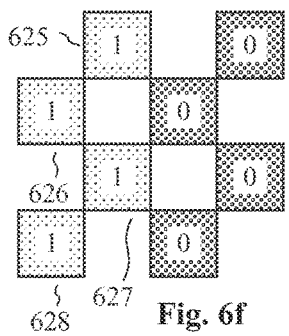
Fig. 6d  
KEY: 01010101  
DECODE: Vert
Fig. 6e  
KEY: 00000101  
DECODE: Diag Up Rt
Fig. 6f  
KEY: 00101011  
DECODE: Diag Dwn Rt
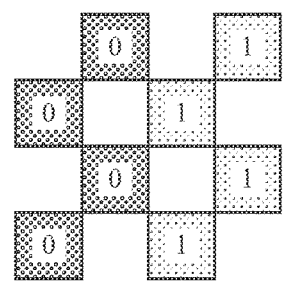
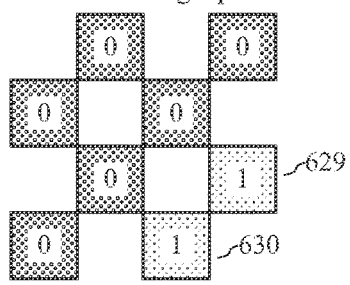
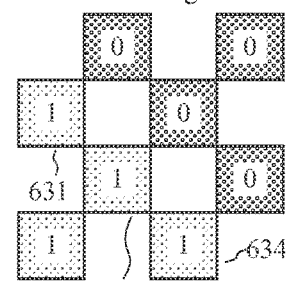
Fig. 6g  
KEY: 00110011  
DECODE: Hor or Vert
Fig. 6h
Fig. 6j  
KEY: 11001100  
DECODE: Hor or Vert
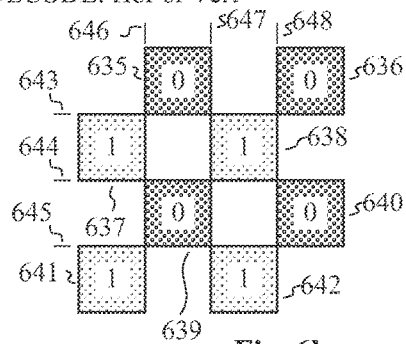
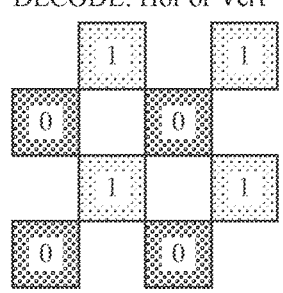
Fig. 6k
Fig. 6l

| 701 | 702 | 703 | | | 704 | | | | 705 | | | | 706 | | | | 707 | | | | 708 | | 709 | | | | | | | |
|---|---|---|---|---|---|---|---|---|---|---|---|---|---|---|---|---|---|---|---|---|---|---|---|---|---|---|---|---|---|---|
| P | E | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 05 | 25 | S S S S S S S S A B C D E F G H |
| | | | | | | | | | | | | | | | | | | | | | | | | | | | | | 0 1 |
| D | N | | -2 -1 | -2 -1 | -2 | | | | | | -2 | -2 -1 | -4 | 4+8 | | -2 -1 | | 4 | | | | | | -2 -1 | | | | | 0 2 1 1 0 |
| D | V, VI | | | -4 | | | | 4 | 4 | 4 | | | -4 | 8 | -4 | -4 | 4 | | 8 | 4 | | | | | | | | | 0 2 2 0 1 1 0 1 |
| D | H, HI | | | | | | | 4 | -4 | -4 | -2 | | | 8 | 8 | | | 4 | -4 | -4 | -2 | | | | | | | | 1 0 1 3 2 0 0 1 |
| D | U | | | | | | | | 8 | 8 | | | | 8 | 8 | | | 8 | | | | | | | | | | | |
| D | D | | | | -4 | -4 | | | | | | | | | 8 | | | | | | | -4 | | | | | | | 2 0 1 1 1 0 1 |
| C | N | | -2 | -2 | | | -2 | | | | | -2 | -2 | -4 | 4 | 4 | -2 | -2 | -4 | 4 | -2 | | | -2 | | | | | 0 0 2 3 0 1 1 |
| C | V, V | | | -4 | | | -4 | 4 | 4 | 4 | | | 4 | 8 | 8 | | -4 | 4 | 8 | 4 | -4 | | | -4 | | | | | 0 2 0 1 0 1 |
| C | H, HI | | | | | | | | 4 | 4 | -2 | 1 | | 4 | 4 | 4 | | | 4 | 4 | -2 | | | | | | | | 2 0 3 0 1 |
| C | U | | | | | | | | | 4 | | | | | 4 | 4 | | | | 4 | 4 | | | | | | | | |
| C | D | | | | | -2 | | | | | | -2 | | | 2+8 | 8 | -2 | -4 | | | -2 | -4 | -2 | | | | | | | 0 0 2 3 0 1 1 |
| H | N | | | | | | -2 | -4 | -2 | | 1 | -4 | 8 | 8+8 | 4 | | -4 | | -4 | | | 2 | | 1 | | | | | 2 0 2 1 0 1 |
| H | V, V | | | | | | | -4 | -4 | | | | 8 | 8 | 8 | | | | -4 | | | | | | | | | 0 1 |
| H, CH, HI T0, B0 | | | | | | | -4 | -8 | -8 | -4 | | -4 | 8 | 8 | 8 | | -4 | 8 | 8 | -4 | | | | | | | | | |
| H | U | | | | | | | -4 | -8 | -8 | | | -4 | 8 | 8 | | | -4 | 8 | 8 | | | | | | | | | |
| H | D | | | | | | | | | | -2 | | | 2+8 | | | -2 | | | | -2 | | | -2 | | | | | 0 0 2 3 0 1 1 |
| V, CV, VI LO, R0 | | | 2 | | | | 2 | | | -2 | -4 | | | 8+8 | | | | | | -4 -2 | -4 | -2 | | | 1 1 | 0 2 | | | |
| V | H, HI | | | | | | | | | | -2 | -4 | | | 8 | | | | | -4 | -4 | | | | -2 -4 | | | | |
| V | U | | | | | | | | | | | | | | 8 | | | | | | | | | | | | | | |
| V | D | | | | | | | | | | | | | | 8 | | | | | | | | | | | | | | 2 1 0 2 1 |
| K | K | | | | | | | | | | | | | | | | | | | | | | | | | | | | |
| SEL | | SC | SD SA | SA SE | SE SD | SD SE | SE SD | SE SE | SF SB SF | SA SD | SD SG | SG | SG | SH | SB | SH | SC | SC | SF | SF SB SF SC | SB SA | SD SG | | | | | | |
| | | | | SE | | | | 11 | 12 13 | | | SH | 22 | 22 | | | 31 | 32 | 33 | | | 41 | 42 | 43 | 44 | | | |
| INPT | | 0 0 | 0 0 | 0 0 1 1 | | 1 1 2 | 1 3 0 | 1 | -1 4 -4 2 | -1 | 0 1 | | | 1 | 1 2 2 | 0 1 1 2 2 | 0 1 2 2 | 1 2 2 | 1 1 2 2 | 2 2 2 | | | | | | | | |
| * NOT USED ALSO FOR SELECTED BORDER CONDITIONS | | | | | | | | | | | | | | | | | | | | | | | | | | | | |

*NOTE: USED ALSO FOR SELECTED BORDER CONDITIONS

Fig. 9

| P | BD | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | SA | SB | SC | SD | SE | SF | SG | SH |
|---|---|---|---|---|---|---|---|---|---|---|---|---|---|---|---|---|---|---|---|---|---|---|---|---|---|---|---|---|---|---|---|---|---|---|
| D | TL |   |   |   |   |   |   |   |   |   |   |   |   |   |   |   |   | 16 |   |   |   |   |   |   |   |   |   |   |   |   |   |   |   |   |
| D | TR |   |   |   |   |   |   |   |   |   |   |   |   |   |   |   |   |   |   |   |   |   |   |   |   |   |   |   |   |   |   |   |   |   |
| D | BL |   |   |   |   |   |   | 16 |   |   |   |   |   |   |   |   |   |   |   |   |   |   |   |   |   |   |   |   |   |   |   |   |   |   |
| D | BR |   |   |   |   |   |   |   |   | 16 |   |   |   |   |   |   |   |   |   |   |   |   |   |   |   |   |   |   |   |   |   |   |   |   |
| C | TL |   |   |   |   |   |   |   | 8 |   |   |   |   | 8 |   |   |   |   | 8 |   |   |   |   |   |   |   |   |   |   |   |   |   |   |   |
| C | TR |   |   |   |   |   |   |   | 8 |   |   |   |   | 8 |   |   |   |   | 8 |   |   |   |   |   |   |   |   |   |   |   |   |   |   |   |
| C | BL |   |   |   |   |   |   | 8 |   |   |   |   | 8 |   |   |   |   |   |   |   |   |   |   |   |   |   |   |   |   |   |   |   |   |   |
| C | BR |   |   |   |   |   |   |   |   | 8 |   |   |   |   | 8 |   |   |   |   |   |   |   |   |   |   |   |   |   |   |   |   |   |   |   |
| H | TL,BL,I0 |   |   |   |   |   |   |   |   |   |   |   |   |   | 16 |   |   |   |   |   |   |   |   |   |   |   |   |   |   |   |   |   |   |   |
| H | BR,TR,R0 |   |   |   |   |   |   |   |   |   | 16 |   |   |   |   |   |   |   |   |   |   |   |   |   |   |   |   |   |   |   |   |   |   |   |
| V | TL,TR,T0 |   |   |   |   |   |   |   |   |   |   |   | 16 |   |   |   |   |   |   |   |   |   |   |   |   |   |   |   |   |   |   |   |   |   |
| V | BL,BR,B0 |   |   |   |   |   |   |   |   |   |   |   |   |   |   |   |   |   | 16 |   |   |   |   |   |   |   |   |   |   |   |   |   |   |   |
| D | L0 |   |   | -4 |   |   | -2 | 8 | 4 | 8 |   |   | -4 | 8 | -4 | -4 | -2 | 8 | 4 | 8 | -2 |   |   | -4 | -2 |   | 0 | 0 |   |   |   |   |   |   |
| D | R0 | -2 | -4 |   |   |   | -2 | 8 | 4 | 8 |   |   | -4 | 8 | 4 | -4 |   | 8 | 4 | 8 |   |   | -2 | -4 |   |   | 0 | 2 |   |   |   |   |   |   |
| D | T0 |   |   |   |   |   |   |   |   |   |   |   |   |   |   |   |   |   |   |   |   |   |   |   |   |   | 0 | 0 |   |   |   |   |   |   |
| D | B0 |   |   |   |   |   |   |   |   |   |   |   |   |   |   |   |   |   |   |   |   |   |   |   |   |   | 1 | 0 |   |   |   |   |   |   |
| SEL |   | SC | SD | SA SE | SE | SD | SE | 11 | 12 | 13 | SA | SD SH | SG | 22 | SH SB SG | SH | SC | 31 | 32 | 33 | SF | SB SF | SF | SC SF | SB | SA | A | B | C | D | E | F | G | H |
| INPT |   | 0 | 0 | 0 | 1 | 2 | 2 | 8 | 4 | 8 | 1 | 3 0 | 0 | 22 | 1 0 1 | 4 | 1 | 8 | 4 | 0 | -2 | 1 | 1 2 | 2 2 | 2 2 | 2 |   |   |   |   |   |   |   |   |

Fig. 9A

KEY: 11001100
DECODE: Hor or Vert

KEY: 00110011
DECODE: Hor or Vert

KEY: 11001100
DECODE: Hor or Vert

KEY: 00110011
DECODE: Hor or Vert

| TL | TL | T0 | T0 | T0 | T0 | TR | TR |
|----|----|----|----|----|----|----|----|
| TL | TL | H1 | H1 | H1 | H1 | TR | TR |
| L0 | V1 |    |    |    |    | V1 | R0 |
| L0 | V1 |    |    |    |    | V1 | R0 |
| L0 | V1 |    |    |    |    | V1 | R0 |
| BL | BL | H1 | H1 | H1 | H1 | BR | BR |
| BL | BL | B0 | B0 | B0 | B0 | BR | BR |

Fig. 11

DIGITAL IMAGE PROCESSING AND SYSTEMS INCORPORATING THE SAME

CROSS REFERENCE TO RELATED APPLICATIONS

This application claims priority of U.S. Provisional Patent Application Nos. 61/149,049, filed Feb. 2, 2009, 61/155,691, filed Feb. 26, 2009, 61/181,770, filed May 28, 2009, and 61/222,532, filed Jul. 2, 2009, under 35 U.S.C. 119(e); the entire content of each is incorporated herein by reference.

INTRODUCTION

It has become desirable to obtain a first series of high dynamic range digital images from high dynamic range digital sources, demosaic the first series of high dynamic range digital images to obtain a second series of high dynamic range digital images having missing color data for each pixel of the first series imputed. It has become desirable to obtain a series of high dynamic range digital images from high dynamic range digital sources, convert said series of high dynamic range digital images to a second series of digital images having a lower dynamic range and display the series of digital images having a lower dynamic range on a display. It should be understood that a series of high dynamic range digital images having missing color data imputed may constitute the high dynamic range digital image source. Commonly assigned U.S. Provisional Patent Application Ser. No. 61/222,532, filed Jul. 2, 2009, discloses such a combination; the entire content of this provisional is incorporated herein by reference.

Commonly assigned U.S. Provisional Patent Application Ser. Nos. 60/900,588, 60/902,728 and 61/008,762; U.S. patent application Ser. No. 11/999,623, issued Oct. 16, 2012, as U.S. Pat. No. 8,289,430; U.S. patent application Ser. No. 12/082,215, filed Apr. 9, 2008, published Oct. 15, 2009, as Publication No. 2009/0256938A1; U.S. patent application Ser. No. 12/150,234, issued Nov. 6, 2012, as U.S. Pat. No. 8,305,471; U.S. patent application Ser. No. 12/157,476, published Jul. 30, 2009, as Publication No. 2009/0190015A1; and Taiwanese Patent Application No. 97103404, filed Jan. 30, 2008, describe high dynamic range sources for use with the present invention. The disclosures of each of the above are incorporated in their entireties herein by reference.

Commonly assigned U.S. Provisional Application No. 60/780,655 filed on Mar. 9, 2006; U.S. Provisional Application No. 60/804,351 filed on Jun. 9, 2006; U.S. patent application Ser. No. 11/684,366, published Mar. 20, 2008, as Publication No. 2008/0068520; U.S. patent application Ser. No. 12/193,426, published Apr. 16, 2009, as Publication No. 2009/0096937A1; U.S. patent application Ser. No. 12/570,585, published Aug. 12, 2010, as Publication No. 2010/0201816A1; and U.S. Provisional Patent Application Ser. No. 61/286,452, filed Dec. 15, 2009, describe various displays for use with the present invention. The entire disclosures of each of these applications are incorporated herein by reference.

It should be understood that a source for high dynamic range digital images may be synthetic in nature; a high dynamic range digital image may be synthesized from a series of images of a given scene acquired with varying exposures. It also should be understood that any commercially available display may be incorporated. In at least one embodiment, a high dynamic range digital image having 5,000,000-to-1 dynamic range is received and a second digital image is produced having a dynamic range of 256-to-1.

BRIEF DESCRIPTION OF THE FIGURES

FIG. 5 depicts a profile view of a digital camera;

FIGS. 6A-H and J-L represent various examples of pixel patters and their associated keys generated and used by the apparatus of FIG. 8;

FIG. 7 depicts a table of product term multipliers used by selectable interpolation equations to calculate missing color data;

FIG. 9 depicts an extended table of product term multipliers to supplement those of FIG. 7;

FIG. 11 depicts classification of pixels near the border of a digital image used to provide missing color data interpolation calculations;

DETAIL DESCRIPTION

Figure 1:
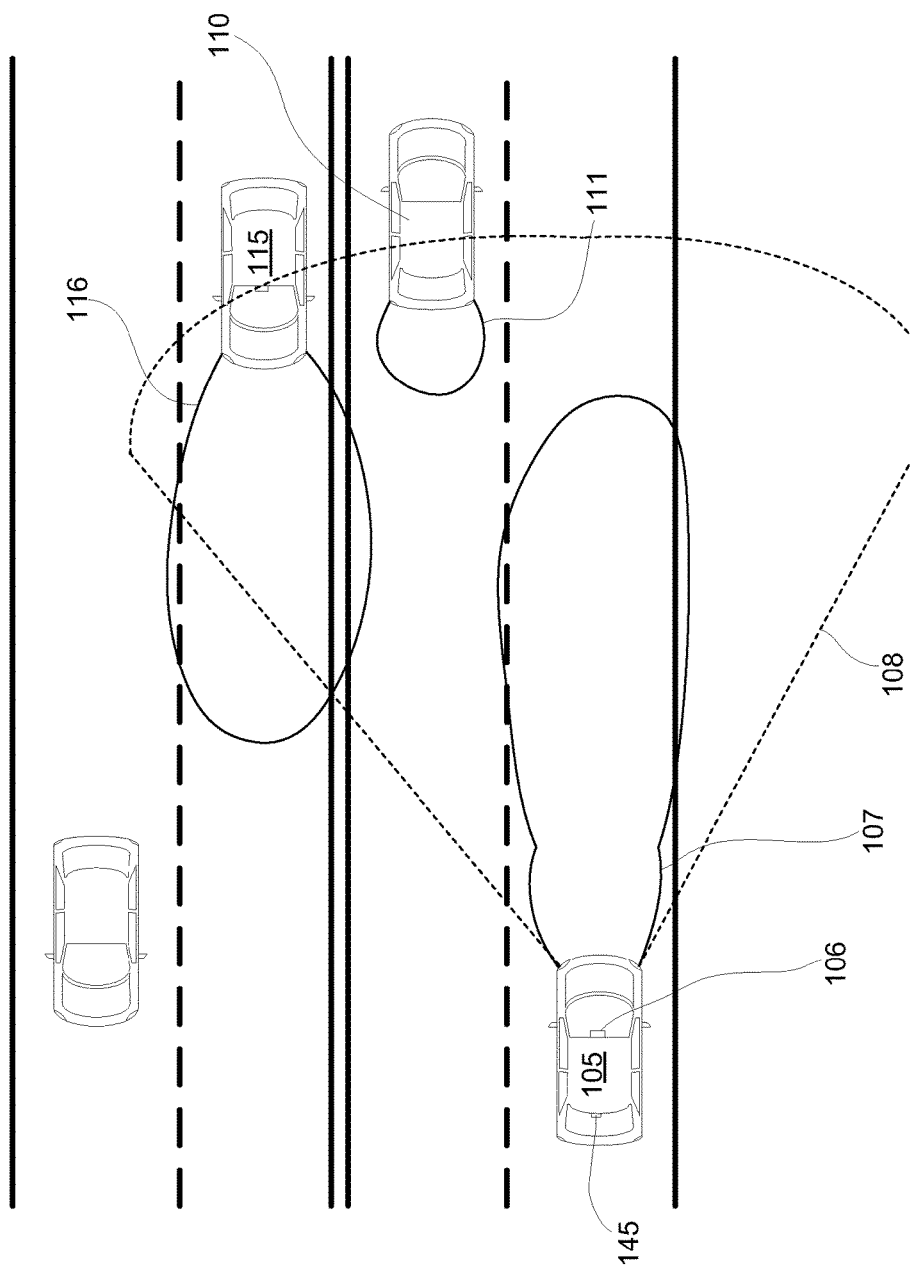
FIG. 1 depicts a plan view of a controlled vehicle proximate other vehicles on a roadway.

Referring initially to FIG. 1, for illustrative purposes, an automatic vehicle equipment control system 106 is shown to be installed within a controlled vehicle 105. Although the control system 106 is depicted to be integral with the interior rearview mirror assembly, it should be understood that the control system, or any of the individual components thereof, may be mounted in any suitable location within the interior, or on the exterior, of the controlled vehicle 105. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 105 and allow for detection of headlights 116 of oncoming vehicles 115 and taillights 111 of leading vehicles 110 within the glare zone 108 associated with the controlled vehicle.

Figure 2:
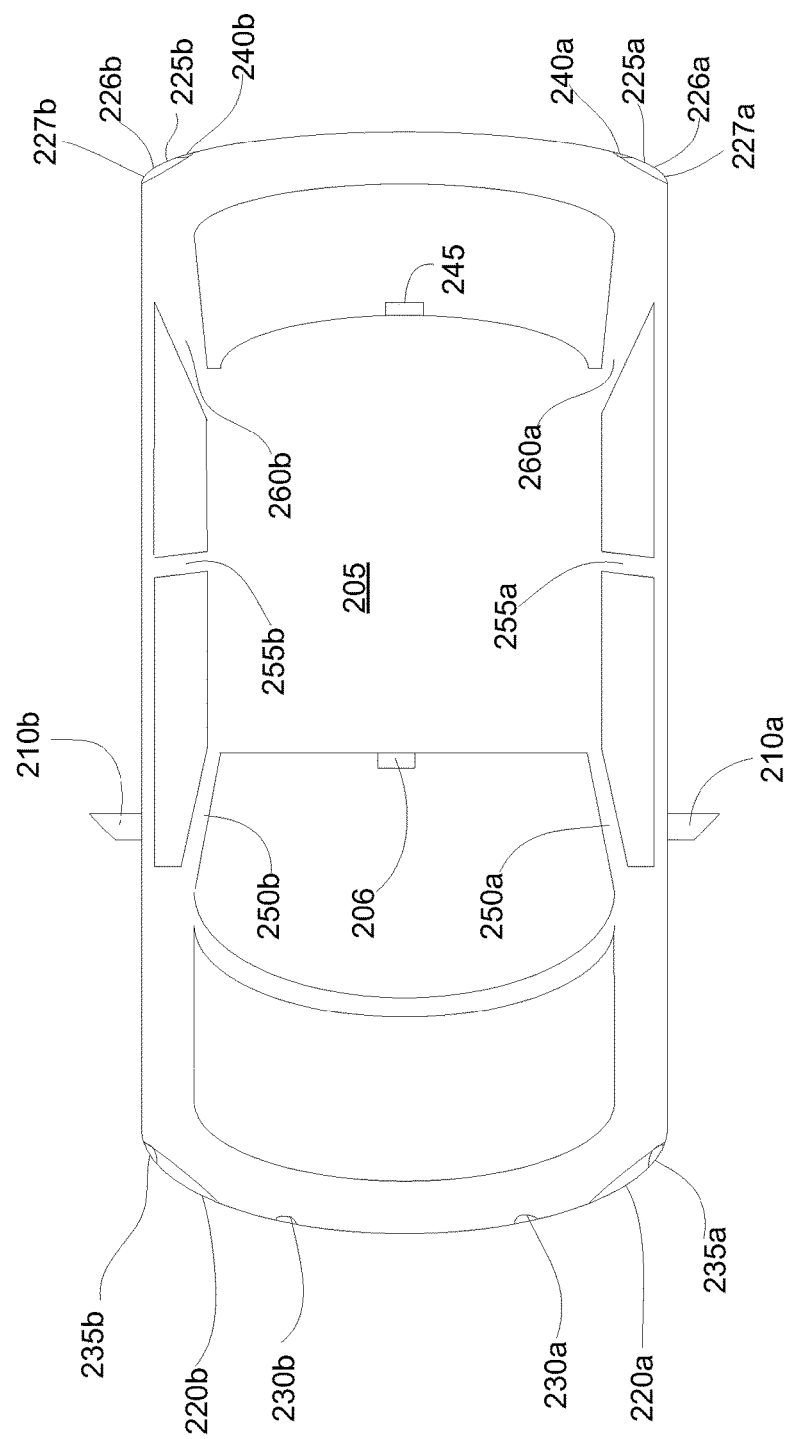
FIG. 2 depicts a plan view of a controlled vehicle having various systems.

FIG. 2 depicts a controlled vehicle 205 comprising an interior rearview mirror assembly 206 incorporating an automatic vehicle exterior light control system. The processing and control system functions to send configuration data to the imager, receive image data from the imager, process the images and generate exterior light control signals. Detailed descriptions of such automatic vehicle exterior light control systems are contained in commonly assigned U.S. Pat. Nos. 5,837,994 5,990,469, 6,008,486, 6,130,448, 6,130,421, 6,049,171, 6,465,963, 6,403,942, 6,587,573, 6,611,610, 6,621,616, and 6,631,316 and U.S. patent application Ser. No. 10/208,142, now U.S. Pat. No. 6,774,988; 09/799,310, now U.S. Pat. No. 6,631,316; 60/404,879; 60/394,583; 10/235,476, now U.S. Pat. No. 6,861,809; 10/783,431, now U.S. Pat. No. 6,895,684; 10/777,468, now U.S. Pat. No. 8,045,760; and Ser. No. 09/800,460, now U.S. Pat. No. 6,587,573; the disclosures of which are incorporated herein in their entireties by reference. The controlled vehicle is also depicted to include a driver's side outside rearview mirror assembly 210a; a passenger's side outside rearview mirror assembly 210b; a center high mounted stop light (CHMSL) 245; A-pillars 250a, 250b; B-pillars 255a, 255b and C-pillars 260a, 260b It should be understood that any of these locations may provide alternate locations for an image sensor, image sensors or related processing and, or, control components. It should be understood that any, or all, of the rearview mirrors may be automatic dimming electro-optic mirrors. The controlled vehicle is depicted to include a host of exterior lights including headlights 220a, 220b; foul weather lights 230a, 230b; front turn indicator/hazard lights 235a, 235b; taillights 225a, 225b; rear turn indicator lights 226a, 226b; rear hazard lights 227a, 227b and backup lights 240a, 240b. It should be understood that additional exterior lights may be provided, such as, separate low beam and high beam headlights, integrated lights that comprise multipurpose lighting, etc. It should also be understood that any of the exterior lights may be provided with positioners (not shown) to adjust the associated primary optical axis of the given exterior light. It should be understood that the controlled vehicle of FIG. 2 is generally for illustrative purposes and that suitable automatic vehicle exterior light control systems, such as those disclosed in the patents and patent applications incorporated herein by reference, may be employed along with other features described herein and within disclosures incorporated herein by reference.

In at least one embodiment, a plurality of imaging devices are incorporated in a vehicle vision system along with at least one display configured to provide the driver with a "bird's eye" view of the area surrounding the controlled vehicle. For example, a first imaging device is integrated into an interior rearview mirror assembly viewing generally forward of the controlled vehicle, a second imaging device is integrated into a CHMSL assembly viewing generally rearward of the controlled vehicle, a third imaging device is mounted proximate the driver's side of the controlled vehicle and a fourth imaging device is mounted proximate the passenger's side of the controlled vehicle. In at least one related embodiment, a digital image processing algorithm is implemented to synthetically "stitch" the individual images into one contiguous image for display to the driver. Any given imaging device, combination of imaging devices or sub-combination of imaging devices may then be employed for additional automatic control/warning tasks, such as: automatic high-beam assist, lane departure, accident reconstruction, collision avoidance, tunnel detection, pedestrian detection, sign recognition, fog light control, etc.

Figure 3A:
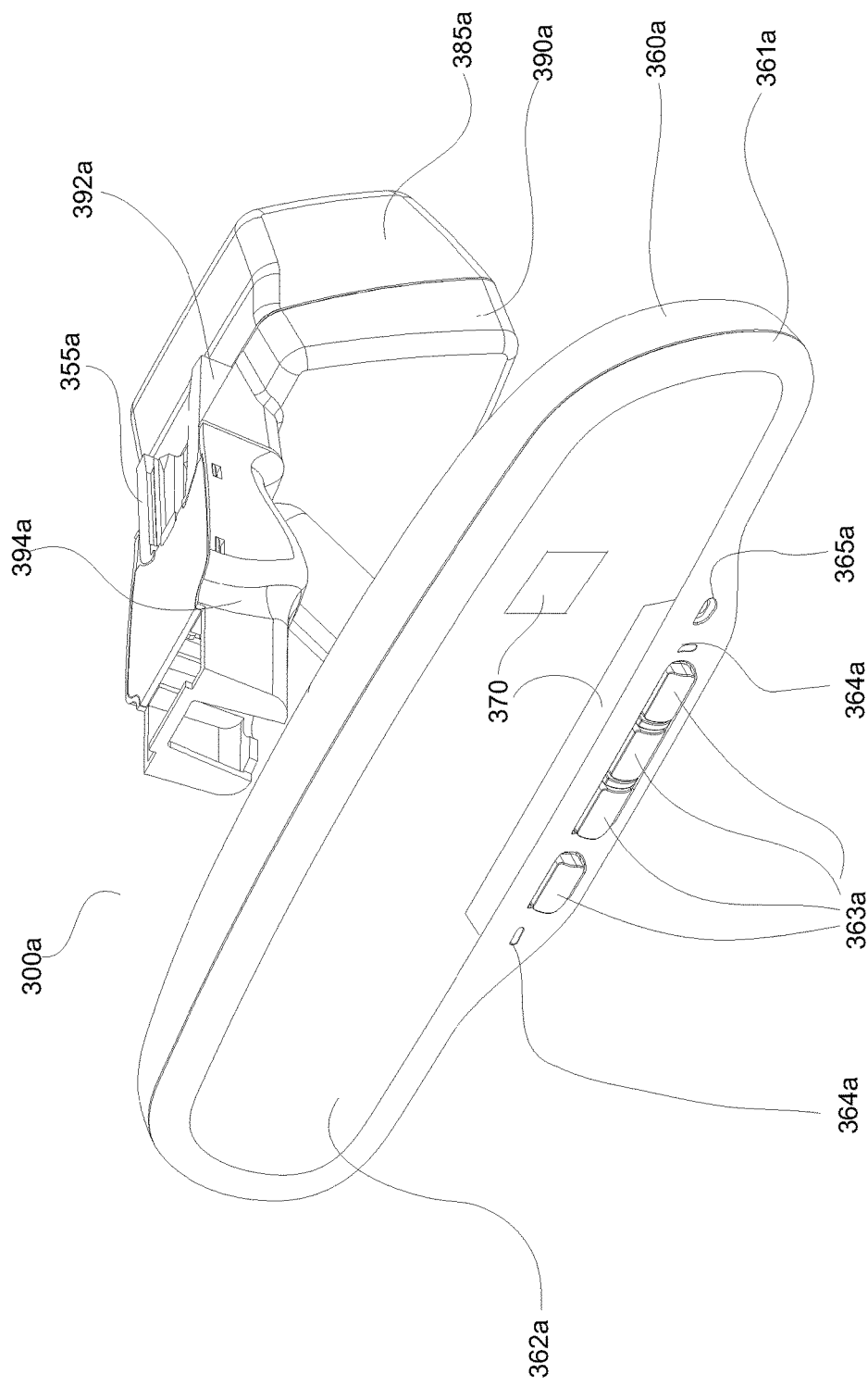
FIGS. 3a and 3b depict perspective views of a rearview assembly for a controlled vehicle.
Figure 3B:
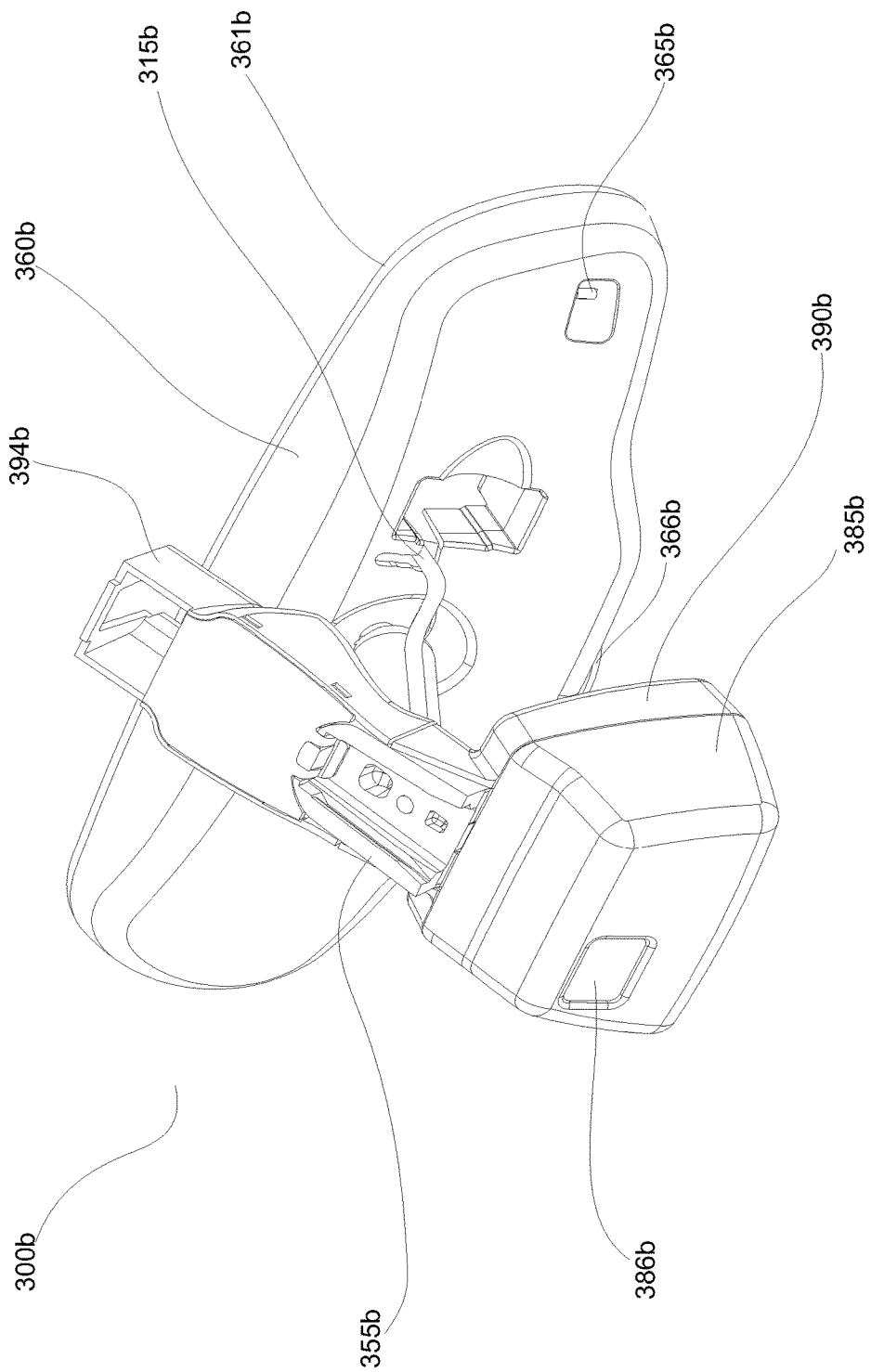

Turning now to FIGS. 3a and 3b, an embodiment of an interior rearview mirror assembly 300a, 300b is shown. The mirror assembly includes a stationary accessory assembly enclosed within a front housing 385a, 385b and a rear housing 390a, 390b. The front housing comprises an aperture 386b defining an image sensor visual opening. The stationary accessory assembly along with a rearview mirror is carried by an attachment member 355a, 355b. The rearview mirror comprises a mirror housing 360a, 360b, a bezel 361a, 361b and a mirror element 362a. A wire cover 394a, 394b is included to conceal related wiring 315b. The rearview mirror assembly 300a, 300b also incorporates an ambient light sensor 365b, at least one microphone 366b, a glare light sensor 365a, operator interfaces 363a, indicators 364a and at least one information display 370.

Figure 4:
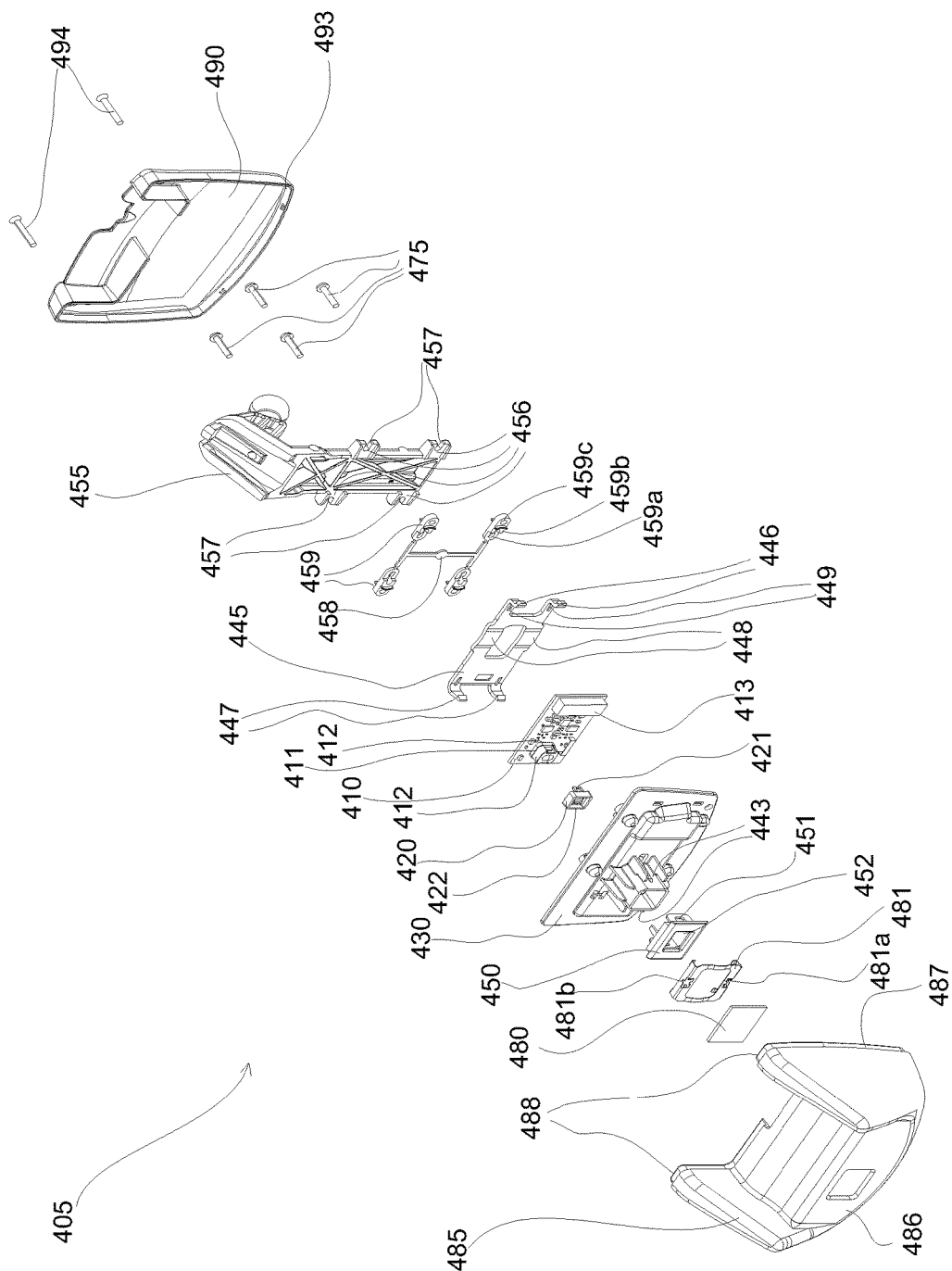
FIG. 4 depicts an exploded, perspective, view of a controlled vehicle accessory module.

Turning now to FIG. 4, there is shown an exploded, perspective view of an accessory and rearview mirror mount assembly 405. In a preferred embodiment, the accessory and rearview mirror mount assembly provides, a rigid structure for mounting a repositionably mounted interior rearview mirror along with a precisely aligned image sensor either stationarily mounted as described in more detail within commonly assigned U.S. patent application Ser. No. 10/783,273, published Aug. 26, 2004, as Publication No. 2004/0164228A1 or automatically repositioning as described in commonly assigned U.S. patent application Ser. No. 10/645,801, now U.S. Pat. No. 7,565,006, both of which are hereby incorporated in their entireties herein by reference. A preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the image sensor is preferred. It should be understood that the present invention has broad application to light sensing optics generally, in addition to, automotive and consumer electronics applications.

Imager board 410 is provided with an image sensor with lens 411. In a preferred embodiment, the imager board will also include an image sensor control logic and timing circuit, communication line drivers and wire harness receptacle 413. Optionally, the imager board may comprise a processor for receiving and, at least partially, processing images obtained from the image sensor. In a preferred embodiment, the image sensor and at least one other device selected from the group comprising: 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. In at least one embodiment, the image sensor with lens 911 includes lens cover snap portions 412 for engaging a lens cover 420 and snap clips 421. The lens cover has an aperture 422 for alignment with the optical axis of the image sensor and lens. Various suitable optical systems, such as those depicted and described in commonly assigned U.S. Pat. Nos. 5,990,469; 6,008,486; 6,130,421; 6,130,448; 6,049,171; and 6,403,942 and U.S. Patent Application Ser. No. 60/495,906, the disclosures of which are incorporated herein in their entireties by reference, may be employed. It should be understood that optics in accordance with the present invention may obviate the need for a lens cover 420 as described in detail herein. It should be understood that the lens cover snap portions, the lens optical cover and snap clips may be eliminated with use of optical elements in accordance with the present invention. In at least one embodiment, the "lens cover" is formed on a molded organic material optics element using a laser as described in detail herein.

An imager board wiring harness (not shown) is preferably provided with plugs on either end thereof. The imager board is preferably provided with a male receptacle 413 for receiving one of the plugs of the imager board wiring harness (not shown).

FIG. 5 depicts a profile view of a digital camera 506 in accordance with the present invention having an imager with lens 511. It should be understood that optics in accordance with the present invention may be incorporated into a host of assemblies included, but not limited to, light sensing, image acquisition, moisture sensing, rear-vision systems, lane departure detection systems, adaptive cruise control systems, occupancy detection systems, security systems, vision systems, color measurement systems, head lamp control systems, variable reflectance rearview mirror control systems, digital video recorders and digital cameras.

Each pixel, irrespective of any associated spectral characteristics, occupies a given spatial area within a two-dimensional array of pixels. Often it is desirable to impart color information in addition to grayscale luminance for any given spatially located pixel. Typically, when spectral filtering is incorporated, each pixel within an imaging device will have an associated spectral filter. Red, green and blue spectral filtering, more specifically a "Bayer" pattern represented by two green, one red and one blue spectral filtered pixels, has become prevalent.

In a typical application of the present invention, missing color values are determined for pixels in an image from an imager that provides one of three color values for each pixel location. Values for the missing pixel color components are determined using techniques that are suitable for but not limited to images having high dynamic range data. Examples are provided herein for a Bayer pattern with red, green, and blue filters. Many of the features of this invention extend naturally to arrays that employ filters of other colors including those with complementary cyan, magenta, and yellow filters, or to filter arrays including clear or substantially unfiltered pixels, and the invention is intend to extend to these applications.

Prior art includes techniques to improve the fidelity of missing color values that are supplied based on known patterns of spatial correlation between separate colors in the image. Examples are U.S. Pat. No. 7,502,505 B2, to Malvar et al. and U.S. Pat. No. 5,805,217A1 to Lu et al. Other prior art techniques provide further improvements based on detecting the presence and orientation of edges in the image. Many techniques to detect edges in the image are based on a determination of one or more first or second derivatives calculated using pixel samples, usually of the same color and from the same row or column for calculation of a given derivative value. An example is US2005/0200733A1 to Malvar, now U.S. Pat. No. 7,643,676. Such techniques may employ one or more threshold values that are applied globally to determine when the value of a calculated derivative is large enough to be classified as an edge. Since most color filter arrays do not include adjacent pixels with the same color, adjacent rows or columns are not sampled in many of the derivative-based calculations used in the prior art thereby making them ineffective or inconsistent at best in detecting stripes that are one pixel wide. For high dynamic range data, pixel luminance values at edges may differ by thousands or even by a million to one in a scene making response of derivatives to an edge in a dimly lighted area much different than response to an edge in a brightly lighted area so comparison of the derivative values to preselected threshold values to determine the presence or absence of a significant edge does not work well with high dynamic range images. In one related embodiment, the present invention relies on a pattern based approach to detect both the presence and the orientation of edges in the image.

U.S. Pat. No. 4,630,307, to Cok, classifies patterns of pixels as geometrical image features and selects from a plurality of image routines based on these features. In examples in the '307 specification, features are classified as edges, stripes, or corners without specifically classifying orientation. In a preferred configuration described in the specification, a set of 4 pixels neighboring the pixel site for which missing color values are being supplied is acquired and used to classify the image at the pixel site as an edge, stripe or corner and this classification is used to select from a plurality of interpolation routines to supply the missing pixel data. In the patent specification in '307 it is stated that the horizontal or vertical orientation of a one pixel wide stripe may not be determined by the four pixel sample and additional samples from an extended set of pixels are acquired in this case as part of the stripe based interpolation routine to interpolate pixel values for stripes and not as part of the pattern recognition routine used to select the interpolation routine for stripes. In the present invention, a sample of more than four, preferably 8 or more, pixels is used in an arrangement for which both the presence and direction of edges including those due to individual one pixel wide stripes may be detected based on the initial sample. Emphasis is on detecting directional orientation and presence or absence of edges based on the sample and making this determination both for discrete edges and for multiple edges that are generally parallel. This classification is preferably used to select an interpolation equation appropriate to the absence of an edge when none is detected and to select an algorithm appropriate to the direction of single or generally parallel multiple edges lying in selected ranges of directional orientation that are detected. A device configured in accordance with this invention performs interpolation using pixel data from pixels that are aligned in directions that are generally parallel to rather than perpendicular to edges in the image in the vicinity of the interpolation site. This results in smoother, sharper edges with greatly reduced zipper artifacts and fewer obviously miss-colored pixels. In a preferred implementation, a key is generated and modifications are made to circuits that perform the interpolation based on decoding of the key either via use of lookup tables and/or decoding circuit outputs. Use of a lookup table or decoder makes it relatively easy to implement a wide variety of options for adjustment to the interpolation circuit. These may optionally include in addition to the usual circuit configurations for nondirectional, and for horizontal and vertical edges, circuit configurations for edges with orientations that are diagonal upward to the right and for edges with orientations that are diagonal downward to the right. Specialized interpolations may also be provided for the border region of the image to use only values that are available and to further provide some degree of optimization in use of available data. As noted above, emphasis is on detection of edges and in their directional orientation without regard to the edge type as multiple (i.e. striped) or single. This does not exclude use of the flexibility of the pattern based image analysis to detect edge orientation and to further detect the type of edges, striped or single and optionally to further detect their specific orientation relative to the pixel for which interpolated values are being supplied (for example, if the pixel interpolation site is inside or outside of a stripe or which side of an edge it is on). Further, specialized interpolation may be provided for certain corner features that include an indication of the orientation of the corner.

An embodiment of the present invention as described in examples herein is configured to be capable of, but not limited, to providing interpolated data at 30 or more frames per second and calculates all values based on the value of the key, the position of the pixel in the image, the color being interpolated, and optionally on data collected from prior processing of pixel data. The circuit that performs the interpolation is configured for a specific interpolation operation based on some or all of the inputs just enumerated and provides the interpolated value based on a sum of products of pixel values from the original image with signed, preferably integer, multiplying factors. The sum of products may be negative or exceed a nominal maximum pixel value. It is preferable to provide a clamping operation as part of the interpolation calculation that replaces any values that would otherwise be negative with zero and as a further option may also replace any values that would otherwise exceed a maximum positive limit with this maximum positive limiting value. The pixel values output are preferably scaled to an integral power of 2, 16 for example, times the input pixel values so that round off errors may be minimized in the calculation but, at or near the end of the calculation, pixel values may be easily rounded or truncated to provide properly scaled output values.

Figure 7A:
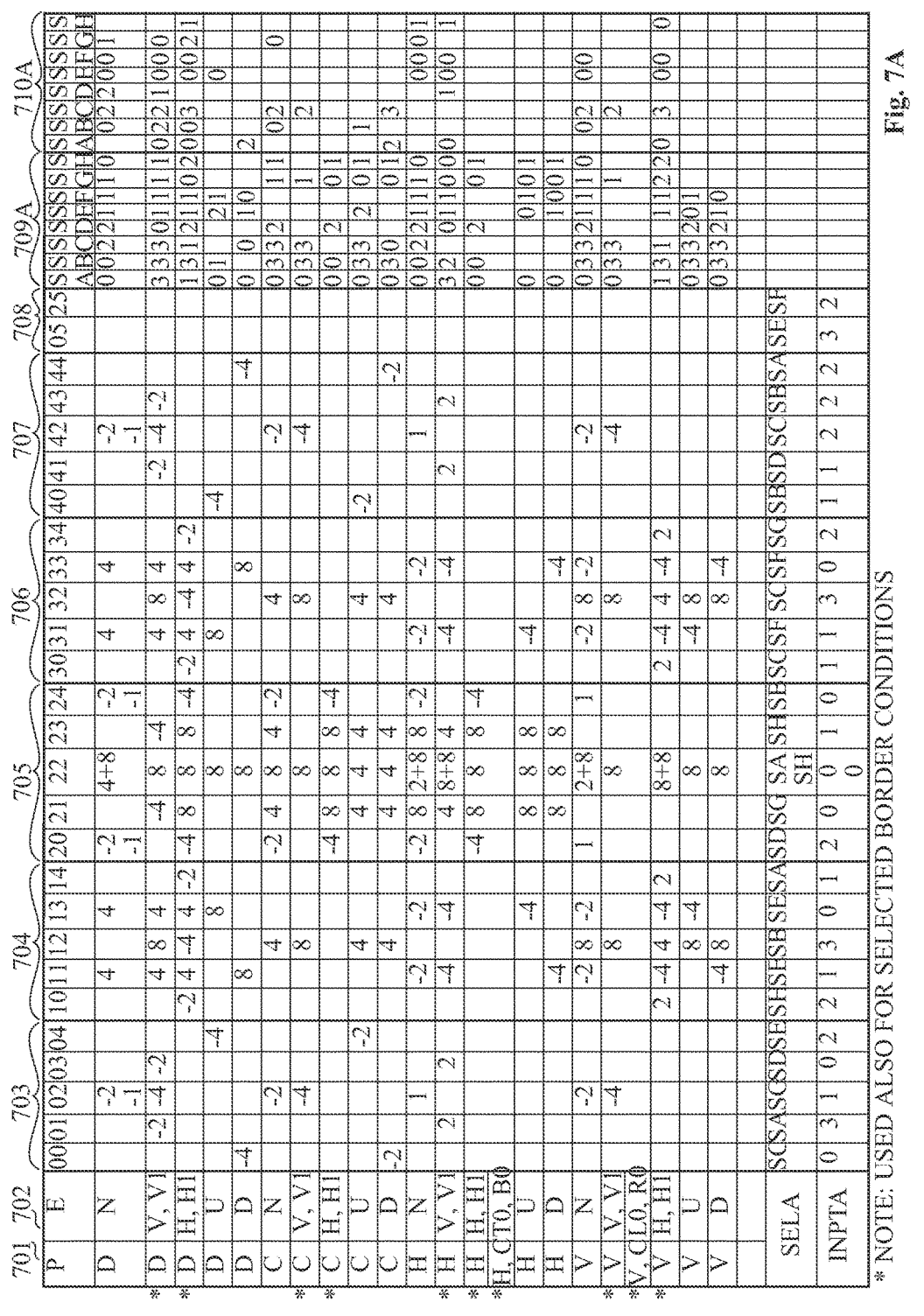
Figure 8:
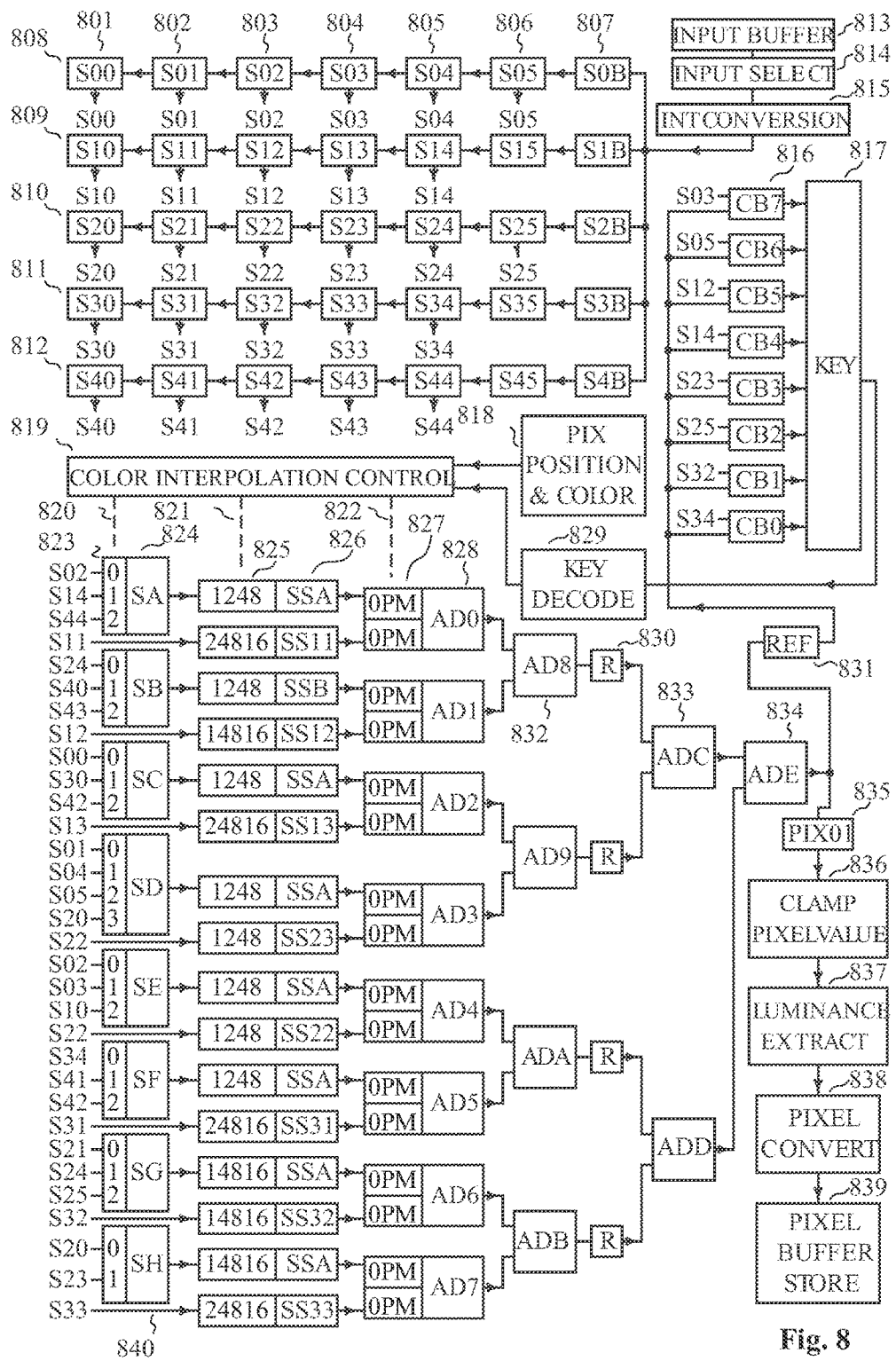
FIG. 8 depicts a simplified schematic of an embodiment of the present invention implementing an averaging based algorithm.

FIG. 8 depicts a simplified schematic of a preferred embodiment of an apparatus that may be implemented in a number of ways including: a field programmable gate array (FPGA), an application specific integrated circuit (ASIC), the form of algorithm(s) executed by a corresponding processor, a combination thereof, or a sub-combination thereof configured to calculate and provide missing color values to an image that is typically acquired from an imager using a color filter array preferably a Bayer type filter pattern. FIG. 7 is a table of product term multipliers used by selectable interpolation equations to provide the missing color values. FIG. 9 is an extended table of product term multipliers that supplements the table in FIG. 7 with optional product term multipliers for use with pixels close to the border of the image. FIGS. 7 and 9 also provide select register settings to read appropriate terms from the array of imager readings provided in the device in FIG. 8. FIGS. 6A through 6H and 6J through 6L represent various examples of pixel patterns and their associated keys generated and used by the apparatus of FIG. 8 in determining the interpolation equation to select for a pixel value that is computed and supplied by the apparatus. FIGS. 10A through 10E depict a direction classifier for multiple fine line features of an image. FIG. 11 indicates classification of pixels near the border of the image used to provide interpolation calculations that are adapted to pixel sites that are near to one of the borders of the image so that the full array of supporting values to perform an interpolation is not available for these pixels.

As a specific example of an embodiment of the invention, an apparatus generates a key based on the values of five or more, preferably 8 like colored pixels selected from a neighborhood of one or more pixels for which missing color values are to be provided. The value of the key is used preferably as an index into a lookup table or as the input to a decoding apparatus to provide an indication or partial indication of which apparatus configuration to select from a multiplicity of selectable circuit configurations to provide the interpolated color value. In at least one embodiment of the invention given as an example, a sample of 8 green pixels having two pixels from each row and two pixels from each column including four consecutive rows and four consecutive columns are summed and a key is generated by individually comparing 8 times each of the pixel values used in the sum with the sum and assigning a value of "1" to the result of the comparison when 8 times the pixel value is greater than the sum of the eight pixel values and assigning a value of "0" otherwise. The eight binary digits, one for each pixel value compared, are assembled in a predetermined order to form an eight bit binary number that serves as a unique key or identifier of a two level image of the eight bit pixel array. The comparison of each of a multiplicity of pixel values to the sum is used to generate individual elements of a pattern and the entire pattern is then used in the determination of the apparatus configuration to select to provide interpolated color values for the pixel location. Basing the comparison on the average or sum of pixel values of the pixels used in the comparisons to generate the key has the effect of making the pattern generated strongly, and even primarily dependent on the relative value of pixels in the set used to generate the key and weakly dependent on the overall illumination of the pixels used to generate the key. This is in direct contrast to application of a predetermined or a globally established threshold value used in many gradient or derivative based edge detection arrangements and makes the invention applicable to images generated by high dynamic range imaging devices. In the example, each of the 256 patterns associated with the 256 possible values of the key may be viewed with 0 and 1 bit values coded as dark and light tiles, respectively, arranged geometrically as they appear in the pixel array from which the key is generated. Illustrations of this are provided in FIGS. 6D through 6L. From these patterns, a choice, in configuration of the apparatus or in the interpolation equation to choose for each pattern may be made using any of a variety of techniques including but not limited to inspection of the patterns associated with the keys as indicated in the examples to determine the presence or absence of edges along with their directions. The choice of interpolation equations to associate with various values of the key may also be established through use of a metric such as a least square error comparison between actual and reconstructed images verses choice of the interpolation equation chosen for each value of the key. Once the choice of interpolation equation for each value of the key is established, these are the relations that are preferably encoded as a lookup table or as a decoding apparatus. In a preferred configuration, one eight bit sample and its associated key is used to select interpolation equations for each of two pixels. Preferably the key may be decoded differently in selecting the interpolation equation for each of the pixels for which it is used to provide flexibility to select the interpolation apparatus based on the specific position of the pixel site in the array of eight pixels that are sampled. The position of the pixel site at which the interpolation is performed relative to eight pixels used to generate the key is illustrated in FIGS. 6B and 6C. As provided in the example, it is preferable that rows and columns containing pixels in the sample used to generate the key include those containing each pixel site where interpolation is performed and further include the row immediately above and the row immediately below each said pixel site where interpolation is performed and further include the column immediately to the left and the column immediately to the right of each said pixel site where interpolation is performed. The position of pixel 611 illustrates the location of the first pixel for which the key is used in FIG. 6B and the position of pixel 613 illustrates the location of the second pixel for which the key is used in FIG. 6C. Red and blue filtered pixels are not included in the group of 8 pixels used to generate the key, but two of the pixels used to generate the key lie in the same row as each pixel for which the key is used and two of the pixels used to generate the key lie in the same column as each pixel for which the key is used.

FIG. 6A depicts the eight green pixels 601 through 608 used to generate the key as indicated above. Note that the patterns of the array of 8 green pixels as selected to generate the key is depicted in consecutive locations in FIGS. 6A through 6C. In most of the interpolation operations, the same equations are applied to supply interpolated red pixel values as to supply interpolated blue pixel values and the essential distinction is to keep track of whether a red or a blue value is being supplied and to output it to the storage location for the proper color. Also, values for green pixels are typically handled in the same way whether the pixels cite for which the green value is being supplied is a red or blue filtered value. Because of the checkerboard pattern of the green filtered pixels and the presence of blue filtered pixels in alternate rows with red filtered pixels in intervening rows, the position in the array and the color pattern of the five by five pixel array may be determined by an alternating odd/even row number for a given pixel in the Bayer pattern in combination with the accompanying, alternating odd/even column number for the pixel location. The combined odd/even classification for the row and the column provides four discrete combinations to identify the set of interpolation routines from which to select the "red or blue blind" interpolation equation for each pixel location and these selections will be offset by one column for odd and for even rows. Since the 8 pixel array used to generate the key is preferably correlated with this alternating pattern, the columns at which the key is acquired and used as indicated in FIGS. 6A through 6C will also alternate by one column for interpolation operations provided for successive rows of pixels in the imaging array. As will be explained in the apparatus description associated with FIG. 8, pixels included in an interpolation operation are entered a column of 5 at a time into a six pixel wide by five pixel high shift register array containing a six stage shift register for each row. Each shift register cell is wide enough to contain the Bayer filtered color component read for the pixel, preferably in integer form. For example, for a high dynamic range sensor, this may require integer sizes and associated register widths of 24 bits or even more. Values are input on the right side and the six pixels in each of the five rows are shifted one pixel position to the left in preparation for supplying missing pixel color component values for the next pixel to the right. The oldest column of five pixels is lost from the array during the shift operation but supporting values are still present in the row buffer for image pixel values until row processing for a portion of the current row is complete and this portion of the oldest of the rows of buffered image data is no longer needed freeing this memory to be used in acquisition of the next row of image data. The dashed line square 610 depicts the 25 pixel five by five array of pixel values used to calculate interpolated pixel values for the pixel I at the center pixel location 609 of the five by five array. The previously generated key is used to select the apparatus arrangement to provide the interpolated values for pixel 609 and the additional column that contains pixel values 602 and 606 one column to the right of the 25 pixel array containing support values for the interpolation is provided to permit generation of the key while the previously generated key is used for pixel 609 so that the key generated for the pixels depicted in FIG. 6A is ready to apply for the next two pixels 611 in FIGS. 6B and 613 in FIG. 6C. The 25 pixel array providing the basis for the calculation is depicted as 610, 612, and 614, respectively, in FIGS. 6A, 6B, and 6C that depict successive locations of pixels 601 through 608 used to generate the key as they are shifted left to perform interpolation operations for successive pixel locations in the row. The key generated from the 8 pixels 601 through 608 is normally used to select the apparatus configuration for pixel 611 and is located as indicated by the 8 shaded pixels of FIG. 6B during interpolation operations for the first of the two pixel locations 611 to which it is applied and is located as indicated by the 8 shaded pixels of FIG. 6C during interpolation operations for the second of the two pixel locations 613 to which it is applied. During performance of the interpolation sequence in FIG. 6C, the next key is preferably generated just as the current one was generated one pixel time early as depicted in FIG. 6A while a previously generated key was used in selection of an apparatus configuration to perform the interpolation operations for pixel location 609. As indicated above, interpolation locations 611 and 613 are each in rows and in columns containing pixels used to generate the key and the rows immediately above and immediately below and the columns immediately to either side of each of the interpolation locations for which the key is used also contain pixels used to generate the key.

FIGS. 6D through 6H and 6J through 6L illustrate 8 of the 256 or so possible patterns used in selection of particular interpolation equations or apparatus configurations to use for interpolation. Many variants of the steps to generate the key may be used to practice the invention. In the example used in a preferred embodiment, eight pixels are used because the sample is large enough to determine the orientation of individual one pixel wide stripes and also multiplication by 8 may be performed by providing an offset that is equivalent to shifting individual pixels three bit positions to the left relative to bit positions in the sum against which they are compared. The multiplication by 8 is performed to effectively compare each of the individual pixel values with the average of the 8 pixels used to generate the key. The sum of eight values is preferably performed using preferably parallel add operations preferably sharing adder and pixel value selection circuits used to calculate the sum of terms for the interpolated color values that are supplied. By sharing this circuitry, relatively modest increases in circuit complexity are sufficient to compute the key. In FIG. 6D, the eight pixel values for green filtered pixels 615 through 622 are summed and the value of pixel 615 shifted 3 bit positions to the left to multiply it by 8 is compared to the sum of the 8 pixels and 0 is placed in the most significant, left most bit position 7 of the key since 8 times the value of pixel 615 is not greater than (is less than or equal to) the sum of the 8 pixel values. A circuit compares the value of pixel 616 left shifted by 3 bit positions against the same sum and 1 is placed in bit position 6 of the key indicating that 8 times the value of pixel 616 is greater than the sum of the 8 pixel values. This same operation is performed on the remaining 6 pixels, preferably in parallel for all of the 8 compare operations, and bits indicating the results of the compare operations are assembled in a prescribed order. The exact order or specific method of generating the key is not important if it is consistent and if lookup table entries and/or decoder circuits are correctly correlated with the relation of values of the key to the actual pattern of the two value image associated with the sampled pixels. Such modifications are considered to be within the scope of the invention. In the examples, the pixel compare results are assembled in order from the most significant to the least significant bit of the key going first from left to right and then from top to bottom in the array of associated pixels so that the results of the compare operations for pixels 615 through 622 are mapped in order to bits 7 through 0 of the key. As an option, it may be observed that in many applications it may make little difference whether the pattern is a bright feature in a darker field or a complementary dark feature in a bright field. In other words, if complementary patterns are to be treated in the same way, one of the 8 bits in the initial key value may be selected and the entire key may be conditionally complemented to create a resulting key for which one bit is always a one or always a zero. This halves the size of the lookup table or the decoding combinations needed to translate the key to select the appropriate circuit configurations to supply a particular interpolated pixel value. This is an option whose use is contingent on whether complementary patterns are to be treated in the same way and then on whether the saving in decoding resources outweighs the cost in time to perform the conditional complementing operation. The time to provide the conditional complement can be very small so use of the option is preferred but not required if the complementary patterns are deemed to be equivalent. Since the circuit has the information as to whether or not the key is complemented, this information may be used with the abbreviated result from the lookup table or decoding circuit used with the complementing option to still provide distinction in actions taken for complementary values of the initial key. For example, for the complementary patterns depicted in FIGS. 6K and 6L and 10A through 10D, it is preferred to take distinctly different actions depending on the complementary state of the original key before conditional complementing. In this case, if the conditional complementing as just described is used, the distinction in actions needed may be effected by use of the signal that indicates whether the key was complemented in the conditional complementing operation along with the indication of the presence of one of the two patterns given by the key for to which the complementing option is applied. The ability to assign any interpretation to each of the patterns provides great flexibility in the assignment so examples given herein are only examples and the invention may be practiced assigning other interpretations for the patterns. There is not a discernible linear edge or stripe in pattern of FIG. 6D so its key is preferably decoded to select interpolation circuits configured for non-directional characteristics in the interpolation. The pattern in FIG. 6E contains a horizontal stripe consisting of lighter pixels 623 and 624 so its key is preferably decoded to select interpolation circuits configured for horizontal edge features in the interpolation process. FIG. 6F and 6G depict complementary vertical edges so their keys are preferably decoded to select interpolation circuits configured for vertical edge features in the interpolation. If for example, key values with a one in bit position 7 were complemented, the key for FIG. 6F would be merged with the key for FIG. 6G illustrating one instance of the option to halve the size of the lookup table or halve the number of decoding circuit combinations. The interpolation circuit options in the examples depicted in FIGS. 7 and 8 include one to improve performance for edges that are directed diagonally up to the right and another one to improve performance for edges that are directed diagonally down to the right. The keys for patterns depicted in FIGS. 6H and 6J illustrate edge patterns that have edges that are directed diagonally up to the right and diagonally down to the right, respectively, so their keys are preferably decoded to select interpolation circuits configured for edge features that are direct diagonally up to the right and diagonally down to the right, respectively, in the interpolation.

FIG. 6K has an alternating pattern of darker pixels 635, 636, 639, and 640 and lighter pixels 637, 638, 641, and 642. This pattern indicates the presence of three edges but it is ambiguous whether they are three vertical edges at 646, 647 and 648 or three horizontal edges at 643, 644 and 645. The complementary pattern of FIG. 6L has the same ambiguity. These are the only two of the 256 patterns that indicate this exact ambiguity and this will be useful since, hereinafter, a circuit that acts in response to each of these two patterns (or the key or keys associated with them) is provided to make a determination or partial determination of the orientation, vertical or horizontal, of the alternating darker and lighter stripes indicated by these patterns. As indicated above and applicable here, the pattern indicates the presence of two or more stripes that are next to each other, one lighter than the other as sensed by the green pixels used to generate the key. The stripe that is lighter than the other is bounded by a darker stripe that adjoins the lighter stripe on one side and a darker area that may but need not be a stripe on its other side and the darker stripe is bounded by the lighter stripe on its one side and by a lighter area that may but need not be a stripe on its other side. All of the indications of darker and lighter refer to levels measured by the pixels in the array used to generate the key. Such patterns may be present where there are two stripes that are each approximately one pixel wide that are adjacent with a dark stripe or area of undetermined width on one side and with a light stripe or area of undetermined width on other side. Images of picket fences or slatted shutters or blinds are likely sources of images that contain adjacent stripes that are approximately one pixel wide and these are often oriented vertically or horizontally. In addition to the ambiguity in direction, the other thing that makes such patterns especially difficult is that within an area of contiguous alternating dark and light stripes that are one pixel wide, all of the red filtered pixels will sense light from the dark stripes and all of the blue filtered pixels will sense the light from the light stripes or vice versa. Normally, the pixel width will not exactly match the width of alternating stripes in the image so there will be an interference pattern as the pixel alignment shifts incrementally a fraction of a pixel width with each successive stripe until alignment changes by one stripe. As the alignment shifts by one stripe the red filtered and blue filtered pixels will change roles from the one that was sampling the lighter stripes shifts to the one sensing the darker stripes and the alternate blue filtered or red filtered pixels changes in a complementary way from sensing the darker stripes to sensing the lighter stripes. This will be significant in the circuit provided to determine the vertical or horizontal orientation groups of contiguous stripes that are approximately one pixel wide in the image.

Figure 10A:
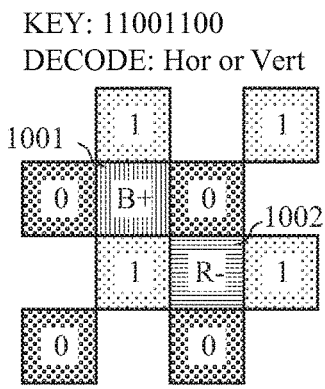
FIGS. 10A-E depict a direction classifier for multiple fine line features of a digital image.
Figure 10B:
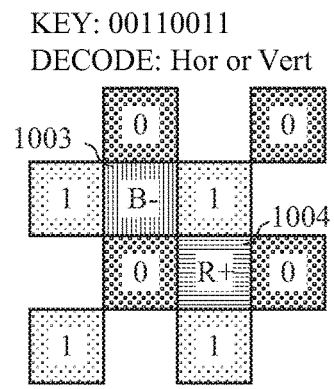
Figure 10C:
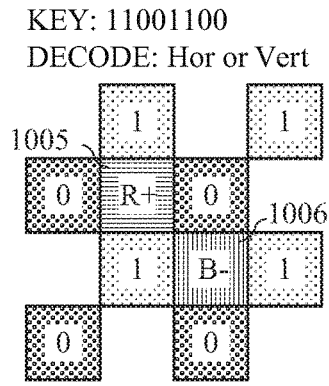
Figure 10D:
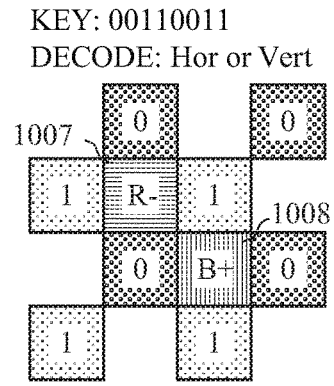

FIGS. 10A through 10D are similar to the patterns depicted in FIGS. 6K and 6L each depict a cluster of pixels used to generate the key. FIGS. 10A and 10C have the same key and have light pixels in their top rows alternating with darker pixels in the next, lighter pixels in the next and darker pixels in the bottom row. FIGS. 10B and 10D have the complementary pattern and a top row of darker pixels, a next row of lighter pixels etc. The darker pixels assigned zero in the key are depicted with a heavier, darker, dot pattern than the lighter pixels. FIGS. 10A and 10B depict red filtered pixels at 1002 and 1004 in locations where they appear when interpolation is being performed for a row of pixels containing red filtered pixels and for this case blue filtered pixels appear in the row above including locations depicted at 1001 and 1003. FIGS. 10C and 10D depict blue filtered pixels at 1006 and 1008 in locations where they appear when interpolation is being performed for a row of pixels containing blue filtered pixels and for this case red filtered pixels appear in the row above including locations depicted at 1005 and 1007. In FIG. 10A, if vertical stripes are present, blue filtered pixel 1001 will be on a lighter stripe aligning with the lighter pixels used to generate the key above and below it in a lighter column and red filtered pixel 1002 will be on a darker stripe aligning with the darker pixels used to generate the key above and below it in a darker column. Likewise in FIG. 10A, if horizontal stripes are present, blue filtered pixel 1001 will be on a darker stripe aligning with the darker pixels used to generate the key on either side of it in a darker row and red filtered pixel 1002 will be on a lighter stripe aligning with the lighter pixels used to generate the key on either side it in a lighter row. Note that darker and lighter have changed depending on whether the pattern is vertical or horizontal. A '+' suffix has been appended to the 'B' indicating the blue filtered pixel at 1001 to indicate that when stripes have a vertical orientation, pixel 1001 is in a lighter column and a '−' suffix has been appended to the 'R' indicating the red filtered pixel at 1002 to indicate that when stripes have a vertical orientation, pixel 1002 is in a darker column. From the description just given, roles will be reversed when the stripes are horizontal and 'B+' at 1001 will be in the darker row and 'R−' at 1002 will be in the lighter row.

For FIG. 10B the complementary pattern as indicated by a different key or distinguished by use or non-use of complementing when the complementing option is used. For vertical stripes, the blue pixel at 1003 is in the darker column as indicated by the appended '−' and the pixel 1004 is in the lighter column as indicated by the appended '+'. For FIGS. 10C and 10D that cover the same complementary patterns for interpolations in the row containing blue filtered pixels, the pattern of results are the same as for interpolations in the row containing the red pixels as just described except that red filtered pixels now occupy locations in the array occupied by blue filtered pixels in the arrays depicted in FIGS. 10A and 10B and blue filtered pixels now occupy locations in the array occupied by red filtered pixels in the arrays depicted in FIGS. 10A and 10B. Thus, the results follow the location in the array rather than the specific location of red and blue filtered pixels in the array and the reversed locations of the pixel in the lighter and darker column again follows the key (before possible conditional complementing) and the complementary or non-complementary pattern that it represents.

Figure 10E:
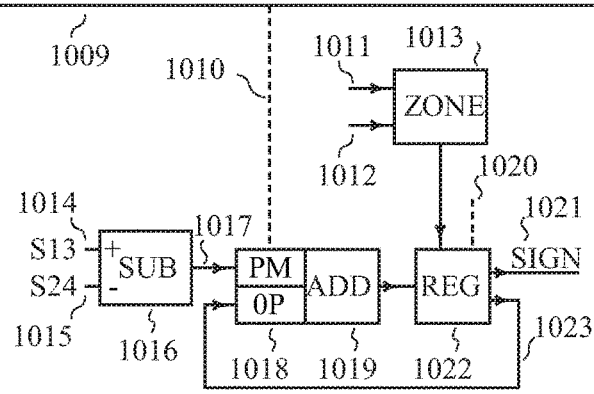

FIG. 10E depicts a circuit used to perform a computation used to select the interpolation circuit or algorithm for vertical edges or horizontal edges when the key for the pixels exhibits one of the two patterns of rows that alternate between all 1 and all 0 as depicted and described in FIGS. 6K, 6L, 10A, 10B, 10C, and 10D. In addition to using the accumulated result of the computation to select the vertical or horizontal interpolation routines, the computation is performed as will be described in response to the occurrence of a pattern of alternating all zero and all one rows as just described. The image is preferably partitioned into one or more preferably rectangular zones that are preferably established by using the row count value 1011 and column count value 1012 in circuit 1013 to partition the image into ranges of preferably contiguous columns preferably within contiguous rows that define rectangular regions in the image and providing preferably separate accumulating registers for each of these zones. Zone select circuit 1013 provides the accumulating register associated with the zone for which interpolated values are currently being provided to the register circuit 1022 in the computation circuit. The accumulating register values are preferably initialized to zero with each new image. Subtraction circuit 1016 inputs red or blue filtered pixel value S13 1014 corresponding to pixel locations 1001, 1003, 1005, and 1007 in FIGS. 10A through 10D and alternate blue or red filtered pixel value S24 1015 corresponding to pixel locations 1002, 1004, 1006, and 1008 in FIGS. 10A through 10D. Subtraction circuit 1016 provides the difference S13-S24 at 1017. This difference is added to the accumulating register for the zone 1022 when the pattern used to generate the key begins with a row of ones in the top row as in FIGS. 10A and 10C and subtracted from the accumulating register 1022 when the pattern used to generate the key is the complementary one that begins with a row of zeros in the top row as in FIGS. 10B and 10D. Inspection of the combinations in 10A through 10D will confirm that with this choice, for vertical stripes, the values sampled from the lighter stripes are added to the accumulating register value and the values sampled from the darker stripes are subtracted from the accumulating register value tending to make the resulting register value positive for the case that the stripes are vertical. Similarly, inspection of the combinations in 10A through 10D will confirm that with this choice, for horizontal stripes, the values sampled from the lighter stripes are subtracted from the accumulating register value and the values sampled from the darker stripes are added to the accumulating register value tending to make the resulting register value negative for the case that the stripes are horizontal. Then for pixels in the associated zone, when the key indicates one of the patterns of alternating rows of all zeros and all ones, the interpolation circuits for vertical edge features are selected when the accumulated value 1022 for the zone is positive and the interpolation circuits for horizontal edge features are selected when the accumulated value 1022 for the zone is negative. Block 1009 includes the circuit that responds to the key indicating the patterns of rows that alternate between all ones and all zeros and issues control signals 1010 to respond with the addition or subtraction of the difference in the two values as just described. As an option, the circuit may keep track of the first occurrence of the above mentioned keys for the image for a particular zone and respond by initializing the accumulated value to the initial value. As another option, the register values may be set, preferably to zero, when interpolation for a new image begins. As a further option for successive video frames, since images tend to be repetitive, initialization may not be performed between successive frames. When the option to bypass initialization between successive frames is selected and also as an option when initialization is performed, it is preferable to limit the extent of the positive or negative excursion of the accumulating register. One way to implement this is to clamp the value to a desired range and another way is to inhibit addition of positive values to the accumulated value when register 1022 already exceeds a specified positive threshold value and to inhibit addition of negative values to the accumulated value when register 1022 already falls below a specified negative threshold value.

The algorithm just described does not always give the desired sign since difference in pixel values due to color may exceed the difference between luminance of the lighter and darker stripes. The preferred configuration that accumulates the difference in pixel values helps somewhat. For zones that include areas where blue/red pixels are aligned with lighter/darker stripes and also includes areas where the alignment has shifted so red/blue pixels are aligned with lighter/darker stripe, the shift in dark and light stripe alignment tends to reverse the bias created by color differences and move toward an average for which the sign of the accumulated value properly indicates the direction of the stripes. These factors make it preferable to establish a balance where the magnitude of the accumulated value, if limited, is permitted to be large enough to permit averaging over areas where the red and blue pixels transition several times between sampling lighter and darker stripes. This consideration also makes it prudent to make zones wide enough to sample along an appreciable expanse of an area such as a picket fence. For example, a trial with zones 32 pixels high by 256 pixels wide gave good results for an image size approximately equivalent to wide VGA.

In summary, an indicator is associated with a portion of an image. This indicator is modified in response to specific patterns of alternating ones and zeros in the pattern image that may result from either close spaced vertical or close spaced horizontal edges in the associated images. The indicator provides an indication of whether horizontal or vertical edges are represented by these specific patterns and their indication is used at least in part to determine selection of interpolation equations for vertical or horizontal edge feature in response to detection of the specific patterns. In the example, the circuit responds to the same patterns to initiate modification of the value of the indicator and to initiate use of the value of the indicator to at least in part establish the choice of the demosaicing circuit. Since, for images that are processed from top to bottom, once a horizontal zone boundary is crossed, a new set of zones is entered and the set of zones just left will not be revisited. This crossing of the horizontal zone boundary may be used as a trigger to initialize the accumulating register associated with each zone in the row of zones being entered and only enough accumulating registers need to be provided to provide one for each of the zones in the row of horizontally aligned zones. The initialization does not need to be complete but may be a set to reduce the magnitude of the indicator value, for example by a set ratio, to retain carry over from zone to zone while reducing the indicator value to prevent results from one zone from dominating and thereby masking weaker features of another zone. For the wide VGA image in the example above, there are approximately 15 vertically aligned zones and only three horizontally aligned zones so three accumulating registers may provide enough storage for the circuit to provide an accumulating register to associate with each of the active zones.

FIG. 8 depicts a simplified schematic of an apparatus configured to provide interpolated values to supply missing color components for an image acquired using a color filter array such as a Bayer pattern to acquire the image. To provide interpolated values, the interpolation circuit sums product terms based on pixel values selected from a 5 by 5 supporting array of pixels with the pixel location for which interpolated values are supplied centered in the 5 by 5 array. Input buffer 813 provides storage for portions of five consecutive rows of image data need to provide image data to supply interpolated values for a row of pixels. For the calculation stage, 5 seven stage shift registers 808 through 812 provide convenient access to pixel values needed to supply interpolated values for individual pixel locations including generation of a key on which detection of edges along with their directional orientation are based. Each of the shift register stages provides storage for a pixel value, preferably in integer form. For conventional image data, this typically requires integer widths of 8 to 14 bits, but for example, for a particular high dynamic range application, 24 bits are needed for each pixel location. With each new pixel site for which interpolation is performed, 5 pixel values are read from the input buffer 813 by selection circuit 814 and if not already provided in the desired form, they are preferably converted to the desired form. For example, to conserve space, pixel data from a high dynamic range imager may be communicated in a more compact floating point format (This may be a specialized floating point format preferably related to selectable integration periods of certain high dynamic range image acquisition devices.) and it may be preferable to leave the data in this format to conserve row buffer memory space, converting it to integer form in block 1035 just before placing each of the pixel values from the row buffers forming the column of five pixel values in one of the five input buffer registers in column 807 that forms the input buffer stage for the shift register based array of storage locations for data accessed to provide the interpolated values. In typical operation, pixel values are presented in buffering column 807 and each of the five rows 808 through 812 are shifted left by one pixel location as interpolated values are supplied for each successive pixel location. Pixel row 810 corresponds to a row of pixels for which interpolated values are supplied with pixel location S22 corresponding to the pixel location for which interpolated values are being supplied.

The pixel values from the array of locations S00 through S45 are accessed by eight selection circuits of which SA 824 is one and by an additional eight dedicated connections of which the connection to S33 840 is one. The eight selection circuit outputs and the eight dedicated connections are each routed to a selectable shift position circuit to provide multiplier selections that represent multiplying factors that are integral powers of 2 (optionally including $2^0$). Shift selection block SSA 826 is one such circuit that provides a selection of multiplying factors of 1, 2, 4, or 8 at 825. Other inputs provide selectable multiplying factors of 2, 4, 8, or 16 or of 1, 4, 8, or 16. The output of each of the 16 selectable multiplication circuits is routed to the input of a 16 input parallel adder circuit one of which is one of the two inputs of adder AD0 828. Each add input is provided with the option to effectively turn off the input by providing 0 or to add or subtract the input. Subtraction is preferably implemented by complementing individual bits and also providing a carry in signal to effectively provide a two's complement when the subtract 'M' option is selected. Four two input add circuits AD8 through ADB accept the outputs from the eight adders AD0 through AD7. The outputs of these four circuits are buffered by pipeline delay registers R 830 and input to two adders ADC 833 and ADD and their outputs are input to add circuit ADE 834 that provides the sum of up to 16 input terms. The parallel add circuit is used both to provide the sum of preferably 8 selected green pixel values that is temporarily registered in REF 831 and to provide the sum of selected terms for the interpolated color values that are temporarily registered in PIX01 835. If the high dynamic range pixel values are 24 bit integers and these may be shifted up to 4 bit positions to provide a multiply by 16 and a sign bit is provided, 30 or more bits may be needed for the adders and registers REF 831 and PIX01 835. If PIX01 is negative, it is preferably replaced by 0 by the clamp pixel value circuit 836 as part of the calculation for the interpolation and optionally 836 may also replace pixel values that exceed a specified value by a specified maximum value. A luminance value is calculated at 837, for example by providing a weighted sum of green, red, and blue values that may, for example, be in a ratio of 60/40/2 for green/red/blue. The calculated luminance and the original green, red, and blue values are optionally scaled and converted in pixel convert block 838 and stored for output or for further processing such as tone mapping at 839. For tone mapping, the logarithm of the luminance is preferably calculated; preferably using conversion to fully normalized binary floating point followed by use of a lookup table or other conversion circuit to convert to a logarithmic value over a one octave range. It is preferable to convert the color components to a logarithmic form also. Then multiplying factors to adjust color balance may be applied as additive constants in the logarithmic domain and the log of the luminance may be subtracted from each of the logarithmically encoded color component values for the corresponding pixel to provide the logarithm of the ratio of the color component to the luminance. This value has a smaller range of values than the original high dynamic range color value and may, for example be reasonably encoded as a 12 bit value so that the three color components may be stored in 36 memory words provided in FPGAs such as those available from Xilinx. Since the logarithm of the luminance of each pixel is used in the tone mapping calculation, it is available to be added back to the scaled color components as one of the final steps in an optional tone mapping operation that preferably follows the demosaicing for applications that handle high dynamic range input data. Most cameras of reasonable quality, even ones not classified as wide dynamic range, provide image data with more than 8 bits of resolution making them useful candidates for the combined demosaicing and tone mapping circuits of this invention. Additionally, the tone mapping, with appropriate choice of compression ratio, may be applied to expand rather than compress the dynamic range making it useful in fog or in viewing X-ray images and in certain images of limited dynamic range that may be present under conditions of limited illumination, so these also are desirable candidates for application of these circuits.

As an example, to generate the key, green pixel values at S03, S05, S12, S14, S23, S25, S32, and S34 are selected by asserting the proper select settings 823 for select circuits SA through SH 824, selecting unity gain for each at 821 and selecting P for the addition for the eight inputs listed above and 0 for the remaining eight unused inputs at 822 and registering the sum in REF at 831. Compare circuits CB0 through CB7 816 compare eight times S34, S32, S25, S23, S14, S12, S05, and S03, respectively with the sum in REF. Each of CB0 through CB7 outputs a 1 if eight times its respective pixel input value is greater than the sum of the eight from REF. These eight one bit values are assembled as bits 0 through 7, respectively, of an eight bit key used to identify the pattern of individual bit values relative to the effective average. (Here eight times each value is compared against the sum to avoid a division step. The multiplication by 8 is performed by displacing specified bit connections by three bit positions relative to the sum. This is the technique used to effectively compare each of the eight bit values against the average of the eight bit values to generate the key that is indicative of the pattern.) The value of the key 817 is routed to the key decode circuit 829 where the value may optionally be compressed, as for example with the complementing circuit described earlier, and then a lookup table or other decoding circuit may be used to classify the image represented by the key preferably providing information on existence and direction of edges as well as on specialized multiple edge patterns such as indicated in FIGS. 6K, 6L, and 10A to 10E. Block 818 provides information on the color of the filter and position in the color filter array for the pixel for which interpolated results are being supplied. Block 818 optionally provides additional information about position in the array relative to the border as indicated in FIG. 11 to provide information to choose specialized interpolation routines for pixel locations next to or close to the image border where the full 5 by 5 array of supporting pixel data is not available. Color interpolation control circuit 819 takes inputs decoded from the key in decoder circuit 829 and of the position in the pixel array from position indicating circuit 818 and generates outputs to provide the input sum for the key and interpolated filter outputs as indicated by the signal selection indications and the signed multiplying coefficients in FIGS. 7 and 9. The color interpolation control circuit responds to the inputs and generates selection control signals at 820 to select the proper input pixel value for each of the select circuits SA through SH that have an active input. Circuit 819 generates shift selection signals 821 to provide the proper multiplier for each of the 16 inputs that are active. Circuit 819 also generates gating and sign selection signals for each of the 16 inputs. '0' is selected for inputs that are unused for a particular sum, 'P', plus, is selected for terms that are added and 'M', minus, is selected for terms that are negative (or to be subtracted). As indicated earlier, the summed terms are registered in REF 831 for the sum used to generate the key and in PIX01 835 for the sum used as the first stage in providing the interpolated color value.

FIG. 7 is a table indicating preferred interpolation term selection and multiplying coefficients used to generate the key and also to generate various interpolated color components as a function of the location in the color array and the existence and orientation of an edge as indicated by decoding of the key with optional inclusion of augmented edge direction indications such as provided by the circuit of FIG. 10E. The various selections of terms and of multiplying coefficients indicated in FIG. 7 are preferably implemented as part of the color interpolation control circuit of block 819 in FIG. 8. In FIG. 7, column 701 indicates the interpolation pattern as indicated by the pixel position and color indicating circuit 818 of FIG. 8 and the interpolated color value or key being calculated. 'D' indicates a diagonal interpolation pattern used to supply a red or blue interpolated value at a blue or red filtered pixel location, respectively. 'C' indicates a crossed interpolation pattern used to supply a green interpolated value at a blue or red filtered pixel location. 'H' indicates a horizontal interpolation pattern used to supply a red interpolated value at a green filtered pixel location in a row containing red and green filtered pixels or to supply a blue interpolated value at a green filtered pixel location in a row containing blue and green filtered pixels. 'V' indicates a vertical interpolation pattern used to supply a red interpolated value at a green filtered pixel location in a column containing red and green filtered pixels or to supply a blue interpolated value at a green filtered pixel location in a column containing blue and green filtered pixels. 'K' is for calculation of the sum for the KEY. Column 702 indicates the existence and/or orientation of an edge in the pattern. 'N' is for nondirectional, no edge. 'V' is for a vertical edge or edges. 'H' is for a horizontal edge or edges. 'V' is for an edge or edges that are diagonal upward to the right. 'D' is for an edge or edges that are diagonal downward to the right. Columns 703 are for pixel locations 0 through 4 of row 0. Columns 704 are for pixel locations 0 through 4 of row 1. Columns 705 are for pixel locations 0 through 4 of row 2 and pixel 22 of this row is the site for which interpolated values are supplied. Columns 706 are for pixel locations 0 through 4 of row 3. Columns 707 are for pixel locations 0 through 4 of row 4. Columns 708 are for pixel 05 from row 0 and pixel 25 from row 2 used to calculate the sum of green pixels during the interpolation operation for the pixel preceding the ones for which the sum will be used. Together the 25 elements in the 5 by 5 pixel portions of the five rows and the two additional pixel locations indicate the 27 pixel values accessible at any one time for calculation of the key and of interpolated values. The column headings for columns associated with individual pixels contain two digit numbers the first indicating the row number and the second indicating the column number of each pixel value in the shift register array of FIG. 8. In FIG. 8, the same numbering is used but an 'S' is used as a prefix for the pixel locations. Summed values for pixel 22 and pairs of values for the first row of values for pixels 02, 20, 24, and 42 indicate provision to access these five pixel locations simultaneously for two sum terms. The dual sums may be used to provide multiplying factors that are not integral powers of 2. Minus signs indicate that terms are subtracted and blank entries indicate that no sums or zero terms are present for these entries. The first row gives the interpolation circuit settings for a pixel value to be supplied using interpolation pattern 'D' and edge classification 'N' that are used in combination for diagonal pattern and a non-directional interpolation, the next row 'D' 'V, V1' for diagonal pattern and a vertical interpolation, etc. and the last row 'K' 'K' is used to provide the sum of eight green values for calculation of the key. The next to the last row labeled SEL indicates select circuit SA, SB, SC, SD, SE, SF, SG, or SH or the direct input 11, 12, 13, 21, 22, 31, 32, or 33 used to access pixel values from the shift register array for summations in FIG. 8. Dual entries indicate dual access to these pixel values and the capability to provide two sum terms using the values. The select circuits SA through SH can each provide only one input at a time and are arranged so that all of the nonzero terms may be summed staying within this restriction. The select inputs provide capability to access the 27 pixel values and provide dual access for five of these using the sixteen summing inputs. The bottom row labeled INPT indicates the select setting asserted on control lines 820 by control circuit 819 of FIG. 8 to access the specified element. Dual entries refer to the separate settings for the dual select elements indicated in the preceding row. Columns 709 indicate the select settings just noted for each configuration of the circuit as indicated in the associated row of the table.

For interpolation sites that are zero or one row or column away from a nearest border of the image, not all of the 25 pixel values are available from the supporting matrix. There are many options that may be used to practice this invention and handle the border conditions. A preferred one is to add capability to the logic circuit to detect the border conditions and to provide interpolation routines that operate using available pixel values. With these provisions alternative options such as, special initialization steps or reduction in the size of the interpolated image may be avoided. With display size often matched to imager size, the option to maintain the original image size is a desirable one. FIG. 11 depicts an array having seven rows and eight columns that provide an example of a classification that may be assigned to pixels that are zero or one pixel locations away from a nearest border. TL, TR, BL, and BR refer respectively to pixels that are in the top left, top right, bottom left, or bottom right portions of the image as indicated in FIG. 11. T0, L0, R0, and B0 indicate pixels that are not in one of the corner zones and are, respectively, next to (zero pixels away from) the top, left, right, or bottom border of the image. H1 and V1 refer, respectively, to horizontal and vertical edge classifications for pixels that are not in one of the corner zones and are one pixel away from a nearest border as indicated by an 'H1' or 'V1' in column 702 of FIG. 7. Any of the border classifications preferably takes preference over use of the key, but the interpolation pattern as indicated in column 701 of FIG. 7 and column 901 of FIG. 9 are still used. In the example, interpolation at border pixel locations has been simplified since relatively few of the pixels in the image fall within this classification. As an option, additional better optimized interpolation circuits may be provided and some of these may use values from the key. FIG. 9 is structured in a way similar to FIG. 7 and includes an indication of pixel value selections and multiplying factors that may be used to provide interpolated values for pixels with the TL, TR, BL, BR, T0, L0, R0, or B0 border classifications as indicated in column 902.

To implement provision of interpolation routines for pixel locations that are near to a border, logic block 818 of FIG. 8 may be expanded to provide border location classifications as indicated in FIG. 11 and color interpolation control 819 may be expanded to recognize and respond to these indications along with the others and to respond issuing appropriate control signals for pixel selection at 820, multiplying factor selection at 821, and 0, add, or subtract selection at 822 to implement the set of interpolation equations from FIG. 9 and for V1, H1, T0, B0, L0 and R0 from FIG. 7 in addition to the ones already implemented from FIG. 7 as described above.

Figure 8A:
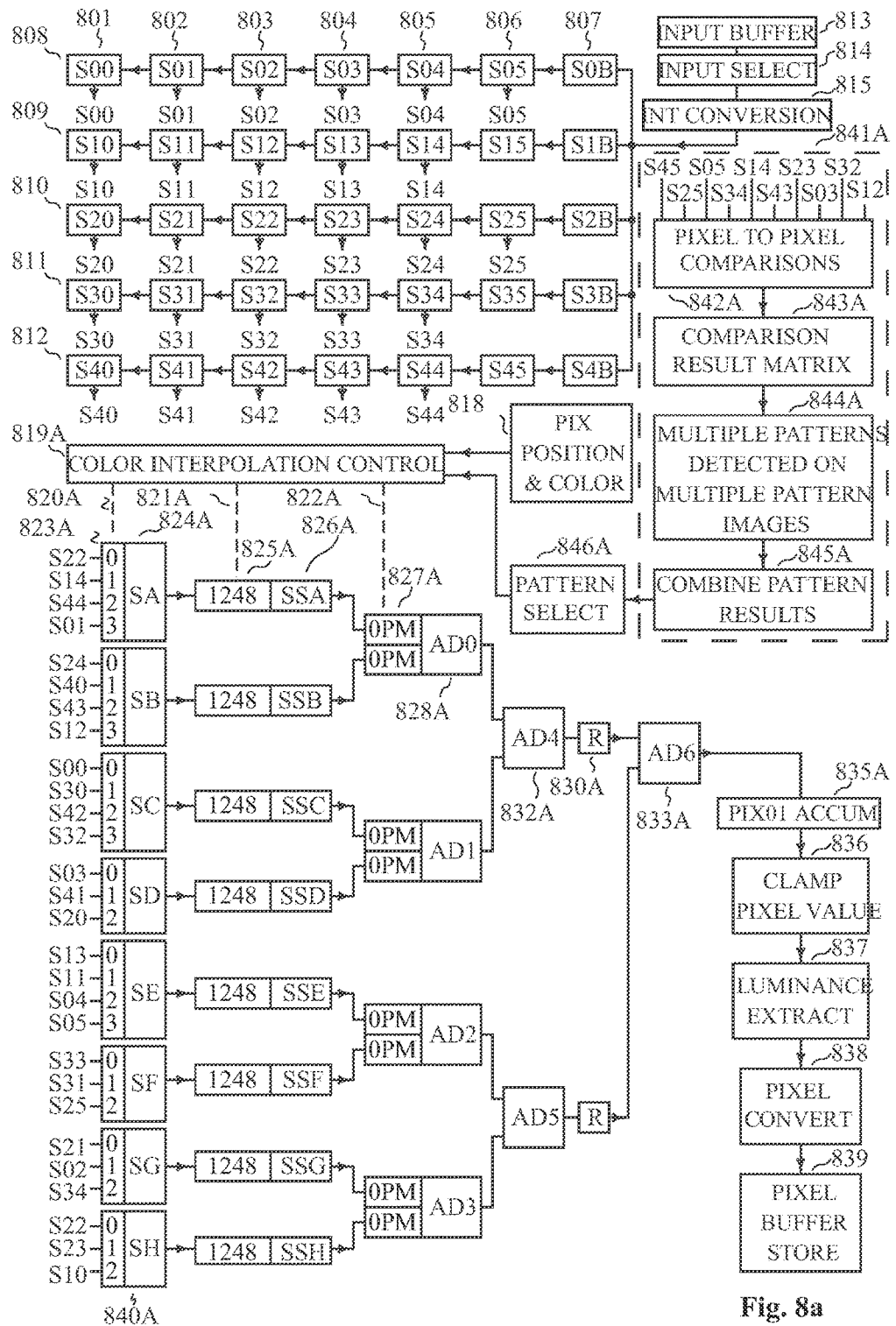
Figure 9A:
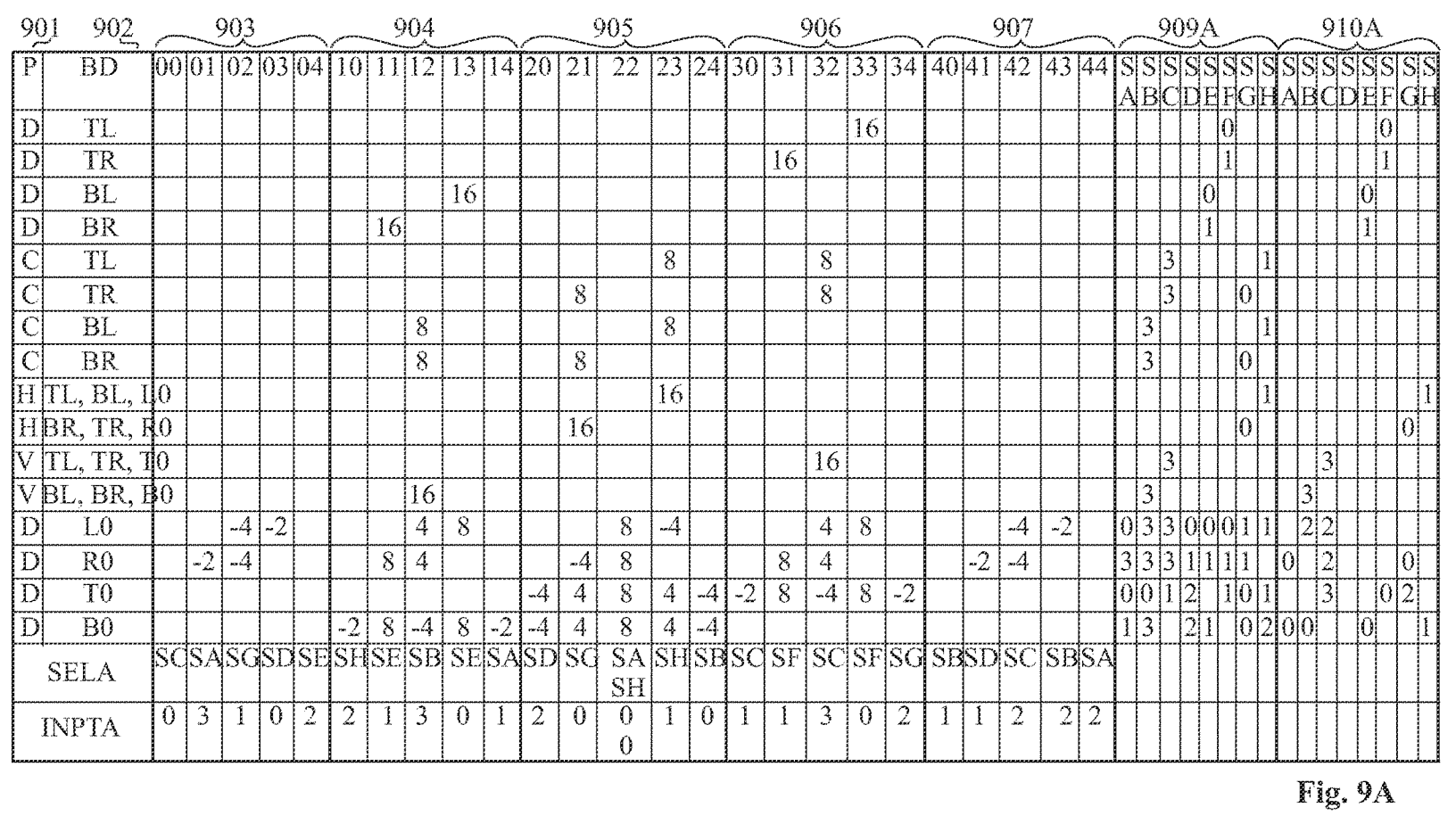

FIGS. 7A, 8A, and 9A are similar to FIGS. 7, 8, and 9, respectively, but implement two options one to replace the 16 term parallel adding circuit with an 8 term parallel add circuit that may be used to add separately chosen terms on each of two add cycles and these terms may be added to yield a result that is similar to if not identical to that achieved with the 16 term serial adder circuit. Optionally, when terms fit into a single set of 8, the second add does not need to be provided and when two adds are provided, a term from the array may be included in each sum with signs and multiplying coefficients that are not necessarily the same for each of the two additions. The other option is based on the generation of multiple pattern images using features that are presented along with the terminology used to describe it as part of FIG. 14 and the related description. The generation of the pattern image based on use of the average of the values of pixels in the pattern (or other threshold value) as a reference is replaced with generation of a set preferably of more than one pattern image where each of the pattern images is preferably based on the use of one of the pixel values in the pattern array as a reference. Additionally, for n pixels in the pattern array, it is preferable to generate n pattern images using the value of each of the n pixel values in the pattern array as a reference pixel value. Then, preferably, each of the n pattern images is analyzed to detect a pattern and the results are combined and prioritized to generate an indication of the presence or absence of a pattern detected in the values of the pixels in the pattern array and to further indicate characteristics such the existence of edges along with an indication of their orientation. The existence of specialized patterns such as the multiple edge patterns for which vertical or horizontal orientation of the edges is ambiguous based on the pattern image alone are also preferably detected and their presence and distinguishing characteristics are preferably indicated.

The circuit implementations share many similar, if not identical, features and the description will center on these differences. In FIG. 8, eight of the 16 terms that are selectively added with selectable signs and multiplying coefficients are provided by select registers SA 824 through SH and eight additional terms S11 through S33 840 are routed directly to the remaining eight adder inputs. Color interpolation control circuit 819 responds to inputs from 818 that indicate the pixel position relative to the border, the color of the color filter for the pixel and the color of the interpolated color component that is being provided. It also responds to information about the presence of patterns such as edges along with their orientation that are detected in the pattern image. These inputs are used to classify the interpolation equation to be applied according to the type of interpolation as indicated in columns 701 and 901 in the tables of FIGS. 7 and 9 and according to the position relative to the image border or the presence of patterns including edge orientation as indicated in columns 702 and 902. Remaining entries in a row indicate pixels and coefficients used to provide the interpolated value. The next to the last rows of tables in FIGS. 7 and 9 each having 'SEL' as a row heading indicates the select register or directly connected input or inputs that may be used to select pixel values for pixels indicated by the pixel designation indicated in the column headings in the first row of the tables. The last rows of the tables each having 'INPT' as a row heading indicates the number of the select register input used to select the pixel designated in the associated column heading. Aside from rows at the top and bottom of the tables, as just described, other rows indicate signed multiplying coefficients for terms to include in the sum to generate a particular interpolated value or to generate the average of the values of pixels in the reference image array. Columns grouped under 709 and 909 indicate selection setting for the eight select registers SA through SH used in FIG. 8 to select values from specified from the pixel that are specified in the row in the table for the interpolation equation. The color interpolation control circuit is configured, based on data from the tables in FIGS. 7 and 9, to respond to inputs from blocks 818 and 829 to select the applicable row from either the table in FIG. 7 or in FIG. 9 and to generate signals on control signal paths 820, 821, and 822 that result in selection in the correct terms and coefficients to generate the appropriate sum of terms as indicated by the entries in row selected from one of the tables to provide the interpolated color value for the interpolation equation. For the circuit of FIG. 8A, like referenced entries are all similar in function to counterparts in FIG. 8 but are typically used to perform two add operations for interpolated color values that are generated and are configured to select different input pixels. Pixel value holding register PIX01 835 of FIG. 8 is modified to PIX01 ACCUM 835A of FIG. 8A and provided with the capability to add the first sum to the second and also to holding the resulting value. The differences in the circuit configurations are intended primarily to reparation the work using fewer resources repetitively with the eight parallel add circuits to accomplish substantially similar overall results. The average based and multi pattern image based pattern recognition may be used somewhat interchangeably, but additional clock cycles naturally utilized by repetitive use of the eight inputs add circuit does fit well with added compare cycles used to assemble the compare result matrix for the multi pattern based pattern recognition. Tables in FIGS. 7A and 9A are similar to FIGS. 7 and 9, respectively, but the next to the last rows each have the 'SELA' heading and the row replaces the row with the corresponding row with the 'SEL' heading and the last rows each have an 'INPTA' heading and the row replaces the corresponding row with the 'INPT' heading. Entries in the 'SELS' rows indicate the one of the select registers SA 823A through SH of FIG. 8A connected to the pixel indicated in the column heading and the entry just below it in the 'INPTA' row indicates the select register input to which the pixel is attached. Several of the pixels have double entries indicating that the pixel may be accessed by more than one select register. Columns 708A and 710A of FIG. 7A replace column 709 of FIG. 7 and provide select register settings for select registers SA through SH for the first and second of the eight input parallel add cycles. Column 909A and 910A perform a similar function in FIG. 10D.

The multi pattern image construction preferably providing pattern detection for each of the pattern images is implemented in circuits depicted in dashed line box 841A and described in more detail in connection with FIG. 14.

Figure 12:
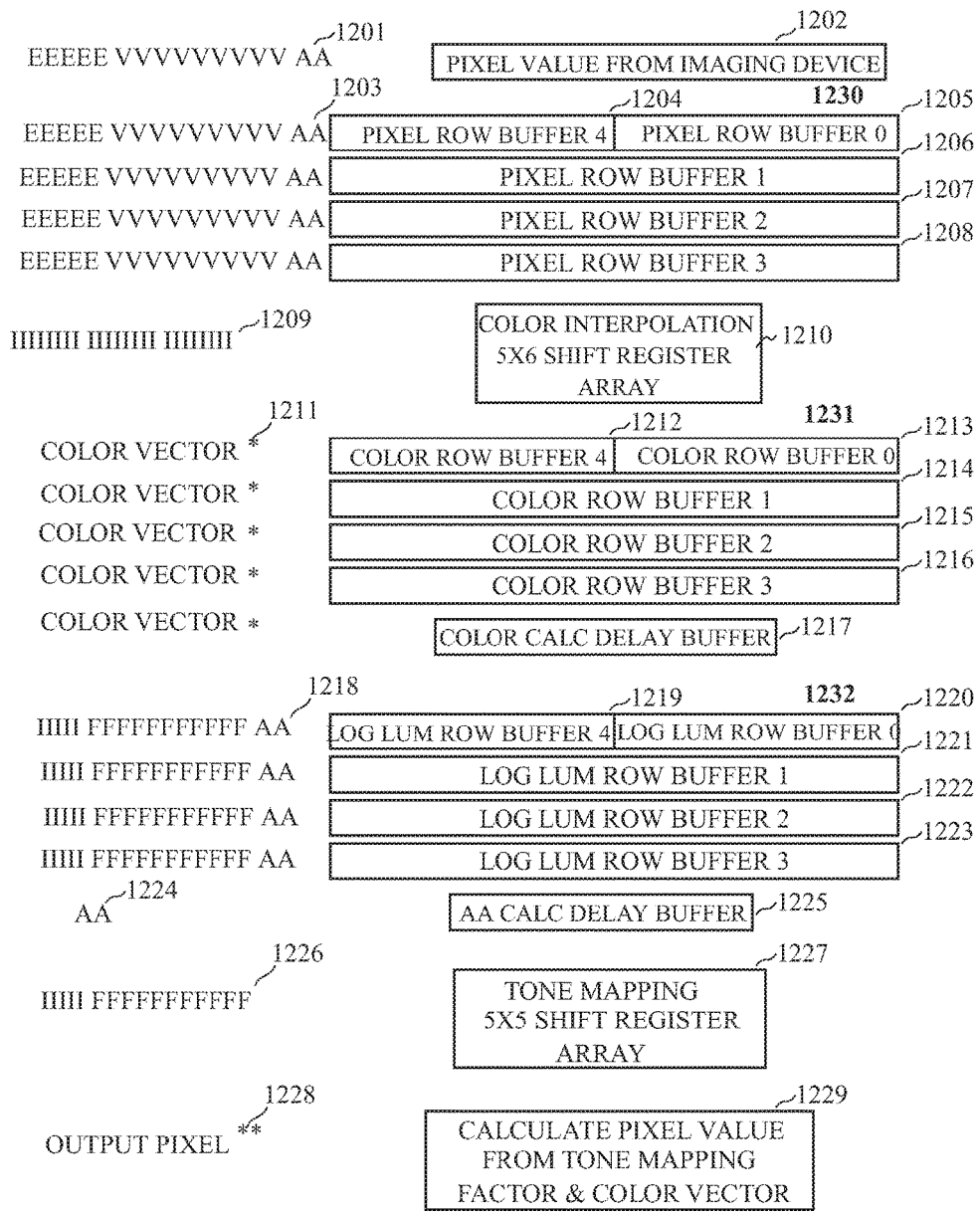
FIG. 12 depicts an example data storage for a system in accordance with the present invention.

FIG. 12 depicts an example of data storage for a system that receives pixel values 1202 from an imaging device and buffers them for color interpolation preferably using the color interpolation circuit presented as part of this invention. The results of the color interpolation are then buffered for tone mapping preferably using the tone mapping circuit presented as part of this invention. For a 752×480 wide VGA image, the memory may, for example, be included in the block ram provided in a Spartan-6 SC6SLX9 FPGA, a product announced by Xilinx.

The logic to perform the color interpolation and the tone mapping is preferably included in the same silicon device as the memory blocks described herein. Examples of preferred data formats are depicted for each of the memory blocks in FIG. 12. 1202 represents a memory location that is preferably configured with a FIFO (First in first out) storage register to provide a preferably small buffer for pixels received from an imager or other image pixel data source that is typically streamed from the imaging device at a relatively consistent rate as it is acquired and processing of the pixel data is preferably begun with relatively little delay. The pixel order is preferably in sequence pixel by pixel for successive pixels in a row and row by row for successive rows in an image. The color interpolation and the bilateral filter operation in the tone mapping each operate on their own individualized supporting array of pixel data. Pixel data from the camera or other image source is used to supply data for the color interpolation, and the logarithm of the pixel luminance value is calculated using the color interpolated output of the color interpolation circuit. For color images acquired using an imager having a color filter array, color pixel values are used along with interpolated RGB (Red, Green, Blue) color pixel values as the data input for the tone mapping. In the examples, a 5 row by 6 column array of imager pixel data is used for the color interpolation and a 5 row by five column array of the calculated, logarithmically encoded pixel luminance values is used for the bilateral filter calculation in the first stage of the tone mapping. The sizes of the supporting arrays are given as examples and the invention is not limited to supporting arrays of this size. Furthermore, the sizes of the supporting arrays for the color interpolation and for the tone mapping do not need to be the same. To acquire n rows by m columns of supporting data for the a calculation, approximately n minus one times the number of pixels per row in the image plus m pixels of image data need to be buffered to provide pixel data over the full supporting array to perform the calculations for a given pixel. As explained and provided for elsewhere, at pixel locations that are near to one of the image borders, pixel data may not be available for the full supporting array. Examples are given of ways to perform the calculation using pixel data that is available and calculations may be performed after the image data available for the supporting array is acquired bypassing buffering operations for data that is not available. The portion of the tone mapping calculation that utilizes the supporting array preferably operates on values in the array that are based on the logarithm of the luminance calculated for each interpolated pixel value so the calculated log luminance values, or at least the interpolated pixel color values needed to support this calculation need to be buffered for the n minus one full rows plus the m pixels to acquire the n rows by m columns of supporting pixel data. After the supporting array based bilateral filter portion of the tone mapping operation, the result of the bilateral filter calculation is used in additional calculations and is combined with the original pixel color component values to obtain the tone mapped pixel output values so the pixel color component values need to be saved in buffer memory while log luminance data calculated from the color pixel values is acquired and used for the supporting array for the tone mapping operation. For $n_c$ rows and $m_c$ columns of data in the supporting array of pixel values for the color interpolation and $n_t$ rows and $m_t$ columns of data in the supporting array of pixel values for the tone mapping operation $(n_c+n_t-2)$ times the image row length in pixels plus $(m_c+m_t)$ pixels need to be acquired, excepting abbreviated requirements for pixel locations that are close to a border of the image, to provide data to perform the combined color interpolation and tone mapping operations. A few additional pixel times may be needed to provide for pipelining delays in the calculations. For five rows of supporting data for the color interpolation and five rows of supporting data for the tone mapping operation, this requires only a little more than eight row times of delay and a little more than eight rows (four rows for each operation) of buffered data in comparison to 480 rows in the image used in the example. This represents only about 1.7 percent of the total image and minimizes the need for buffer memory and the added delay between acquisition and display or processing of an image for control applications.

In FIG. 12, pixel values acquired from an imager are acquired and optionally temporarily buffered in input register or buffering array 1202. After optional conversion in pixel format, values from buffering register's 1202 are stored in imager data row buffer array 1230. Buffer arrays 1230, 1231, and 1232 are preferably organized in similar arrangements, so the most detail will be provided for 1230. The buffer is preferably configured for cyclical access so the newest pixel is entered at the last pixel location at the end of buffer area 1204 that provides storage for the portion of the newest row of pixel data being entered overwriting the corresponding portion of the oldest pixel data stored in the pixel area 1205. For n rows of supporting data, n–1 rows of storage are provided by partial rows 1204 and 1205, and full rows 1206, 1207, and 1208. Optionally. full rows of buffering space may be provided for each of the five rows of buffered data relaxing the need to carefully sequence access to data. A small number of temporary storage locations for pixel data may be provided where needed to assure that pixel data needed for calculations may be acquired from the buffer 1230 before it is overwritten. Since the size of the memory blocks needed to provide row buffer space for imager pixel row buffer 1230, color vector row buffer 1231, and logarithmically encoded luminance value row buffer 1232 together consume a significant silicon area and the amount of memory needed to meet these storage requirements may be the limiting factor that determines the size and cost of an FPGA needed to implement the design for an FPGA based implementation, the preferred option to provide a shared space for the partial row storage needed for portions of the first and last rows of buffered image data is presented here. As indicated elsewhere, a column of pixel data is acquired simultaneously or in a preferably short time interval from buffer 1230 and after an optional format conversion is stored in the color interpolation register 1210 where it is used with adjacent columns of data previously saved in buffer area 1210 to provide ready access to the supporting kernel of pixel data for the color interpolation calculation. In a preferred sequence, to provide the new column of pixel values, one for each of the five rows of data in the kernel in the example, the pixel value about to be overwritten by the pixel from imager data from register 1202 is read from the beginning of pixel row buffer 0, and this value, the value about to be written to row buffer 4, and pixel values from corresponding pixel column locations in pixel row buffer 1 1206, pixel row buffer 2 1207, and pixel row buffer 3 1208, constitute the column of pixel values that are written to the working register array 1210 after optional format conversion. In a preferred implementation, the pixel value acquired from input register 1202 is then written to buffer register 1204 overwriting the value just read from pixel row buffer 0.

As just indicated, buffer area with partial color row buffer 4 1212 and color row buffer 0 1213 in a shared area and color row buffer areas for rows 1, 2, and 3 at 1214, 1215, and 1216 are preferably handled in a similar way so one should refer to 1230 for the more detailed description. As noted earlier, the number of rows of storage provided for buffer 1230 is preferably equal to the $n_c-1$ and the number of rows of storage provided for buffers 1231 and 1232 are preferably equal to $n_t-1$. $n_c$ and $n_t$ are both five in the example but either or both may be other values and $n_c$ does not need to equal $n_t$ to practice the invention. Color vector values in buffers 1231 and logarithmically encoded luminance values in 1232 are preferably entered at nearly the same time and since the logarithmically encoded luminance values are calculated based on the corresponding color vector value, the two separate buffers may be administered as a combined, shared structure or as a further option, the logarithmically encoded luminance value may not be buffered but calculated as needed. The complicating factor for implementing this option is that when the logarithmically encoded luminance values are not buffered their values need to be calculated once for each row in which they are used in the kernel or supporting array ($n_t$ or five times in the example) so the somewhat involved logarithmically encoded luminance computation may need to be repeated $n_t-1$ times after the first. Color vector values in 1231 generally need to be accessed for only one set of calculations to compute the final tone mapped pixel value and this may lead to some simplification in some applications so that buffer 1231 and color calculation delay buffer 1237 may optionally and even preferably for some applications be provided as a single first in first out or other block storage style of memory device. The only access needed in the preferred implementation is to read values from the first location of color row buffer 0 1213 before overwriting this location with the value input at the last location of color row buffer 4 1212. When the row correlated buffer as shown is used, color calculation delay buffer 1217 provides storage to cover the pixel processing time increments for the time that values are in the array 1227 during calculation and also additional pixel processing times to allow calculation pipeline delay times and scheduling times from the time that the value is read from color row buffer 1213 before it would otherwise be overwritten and the time that it is used in the calculation to provide the tone mapped pixel value.

The pixel acquisition information AA that is optionally included with the input pixel value is preferably buffered and kept correlated with the pixel for which it was generated and passed from the image pixel value input to the demosaiced, tone mapped pixel value output. The values AA are stored with the logarithmically encoded luminance value along with 16 bit logarithmically encoded luminance values to utilize the 18 bit storage locations provided in the Xilinx FPGA but may be buffered separately or may be grouped with the color vector values.

Examples of pixel data formats are given for an imager that provides high dynamic range pixel data encoded in a binary or other floating point data format. The data from the imager as indicated at 1201 may, as an example, be zero for zero values and may be fully normalized for non-zero values with the leading 1 in the binary value suppressed. The five bit binary exponent is EEEEE and the 9 bit binary value is VVVVVVVVV. AA is optional data associated with the pixel value that may, for example, indicate if the pixel value is the result of a saturated reading or of an under-utilized A/D range. Such indications may indicate that the illumination of the pixel varied over the integration time, perhaps due to a varying light source or the presence of a high contrast edge in a part of the scene that is in motion during the exposure. Other reasons for anomalies may be due to the choice of imaging device settings for the image acquisition. In all of these cases, the information provided by AA may be helpful in responding appropriately to the acquired image data. The indication, if provided may optionally be fewer or more than two bits long. Pixel data in buffer 1231 may optionally be stored in the same format as 1201 or optionally in integer form or in a modified floating point form. Data is preferably converted to binary integer form (24 bits in the example) for the color interpolation calculation.

In the preferred design, interpolated, high dynamic range, RGB color pixel values are provided by the color interpolation calculation and the luminance value is preferably calculated for each pixel value and preferably converted to a logarithm to the base 2 value having a binary encoding. This value may take the form of values 1218 of a five bit integral part IIIII and an eleven bit fractional part FFFFFFFFFFF. The value AA is grouped and stored with the 16 bit logarithmically encoded luminance value primarily to utilize the 18 bit width provided for memory blocks in the Xilinx FPGA. The red, blue, and green components of the pixel color components may each need 24 bits or more to represent them in binary integer format without losing resolution. As a preferred option, to preserve needed resolution and represent the color values more compactly, each color component is converted to a floating point or preferably to a logarithmically encoded format, preferably like, or at least compatible with the format of the logarithmically encoded luminance value calculated for the pixel and the logarithmically encoded luminance value is preferably subtracted from each of the red, green, and blue logarithmically encoded color component values for the pixel to create the color vector values to store in the buffer area. The subtraction in the logarithmic space corresponds to division to provide the ratio of each color component to the luminance value in linear space. This logarithmically encoded ratio typically covers a smaller range than the original pixel color component value enabling a more compact representation of the pixel data. The color components, when expressed as a ratio of color component value to luminance so that the resulting ratio is a dimensionless value becomes transparent to tone mapping algorithms, such as those provided in the provisional patent applications relied upon for priority in the present application and as incorporated in their entireties herein by reference, so that the value is already in the same form that it assumes after tone mapping and its value is unchanged by the tone mapping. In other words, the ratio becomes transparent to the tone mapping operation. Because the dimensionless ratio of the original color component to the luminance of the pixel is in a form that is not changed by the tone mapping operation, it is not subject to luminance compression factors that may deviate greatly from unity in the tone mapping operations. Thus, values representing the pixel color in dimensionless form may be encoded and stored in a resolution that supports its final use for rendering of the tone mapped image thereby reducing the buffer storage space and data link transmission bandwidth requirements. In many cases, the resolution needed for final rendering of the image may be supported by eight or fewer bits per color component. The preceding applies to RGB encoding but necessitates the redundant storage of three color components in addition to the logarithm of the luminance. It is preferable to use and convert to a color space that expresses luminance either directly or indirectly as one of its components. For example if the popular YUV pixel encoding is used where Y is luminance and U and V are color components, U/Y and V/Y are dimensionless as indicated and may be calculated before tone mapping and optionally expressed in logarithmic form. In calculation of the ratio, to avoid division by zero, a convention such as supplying a black equivalent for U/Y and V/Y (or R/Y, G/Y, and B/Y) may be used for this special case. The values just indicated may be used for the COLOR VECTOR values 1211. If the YUV or other color space having luminance as one of its components is used, since luminance Y is one of the three components, there are only two color dependent components rather than the three color dependent components present in the RGB color space. Then only the luminance term is affected by the tone mapping and only the U/Y and V/Y terms need to be stored in buffer 1231 during the tone mapping operation. If the RGB color space is used, only the separate luminance term is affected by the tone mapping operation and as with U/Y and V/Y, the R/Y, G/Y, and B/Y terms are transparent to tone mapping, but there are three terms instead of two. Since the logarithmically encoded luminance value is stored with the color vector value, the tone mapped pixel values in the form where they are not divided by the pixel luminance may be recovered by multiplying the color components expressed as dimensionless ratios by the tone mapped pixel luminance value to provide the tone mapped color pixel value. For logarithmically encoded values, addition of the logarithmically encoded pixel luminance to the logarithmically encoded color component in ratio form is the equivalent of taking the product of corresponding linearly encoded terms. If the pre tone mapped value is needed instead, then the color components that are in ratio form may be multiplied by the pixel luminance value that is not tone mapped. The advantage is that in the format just indicated, the pixel color information may be represented with reasonable resolution using fewer bits, (8 or 12 or fewer bits per color component in the examples as opposed to using as many as 24 bits or more in linearly encoded integer form) for each of the color components. The values generated as just described may, as an example, be encoded as a binary encoded logarithm to the base 2 with a four bit integral (signed or offset binary form) part IIII and an eight bit fractional part FFFFFFFF. Values that would otherwise be less than or greater than the range provided in the memory locations are preferably clamped to the corresponding minimum and maximum values for the range that is provided. In this way, values that might otherwise be badly in error if randomly clipped are set to their nearest equivalent value for the range provided.

Values 1203 stored in row buffer 1230 may optionally be left in the same floating point format as indicated for values 1201 as received or optionally converted to an alternate format such as integer form at the input stage. Values 1211 are converted to 24 bit binary encoded integer format as indicated at 1209, preferably as part of the operation to read them from buffer 1230 for use as source data for the color interpolation calculation in register 1210. The color vector 1211 is preferably encoded compactly as a ratio using one of the options described above and may, for example be encoded as a pair of 8 bit values that need only 16 bits of storage space. Alternatively, the color information may be encoded as a 36 bit value made up of three 12 bit logarithmically encoded values generated as indicated above, with the three values for the respective red, green, and blue pixel color components as depicted in the alternate version for the first note of FIG. 12. The logarithmically encoded luminance values with the optionally included pixel acquisition information AA are preferably encoded as described previously and the five bit binary value IIIII and 11 bit fractional value FFFFFFFFFFF along with AA represent the data format 1218 preferably stored in log luminance row buffer 1232. The log luminance values 1226 read from buffer 1232 are preferably read without inclusion of the pixel acquisition information AA and used, preferably in the format in which they are stored, as the data base for the bilateral filter calculation that uses values from tone mapping register array 1227 as the source of pixel kernel values for the bilateral filter calculation. The buffer 1225 provides buffer storage for pixel acquisition information AA during the time starting when this data would be overwritten if left in buffer 1232 and ending when it is included with the output pixel value 1228. The output pixel value preferably includes values that are successively subjected to color interpolation and then to the tone mapping operations. The values are preferably output in a form that is ready for additional image processing such as stitching or de-warping and/or feature recognition or display. This form may, for example, be an eight or more bit integer representation for each color component as indicated in the second note in FIG. 12 and may include the pixel acquisition information AA. Other bit lengths may be provided for pixel data depending on the application. The features indicated in FIG. 12 may be applied for configurations of the device that may, for example, include tone mapping but not color interpolation or color interpolation but not tone mapping. In these applications, data items not needed for the configurations may be omitted.

As pixel row buffer 4 expands to complete row 1205 and become a full row, pixel row buffer 0 shrinks to zero size. Calculations for pixels in the current row are completed for the border columns of pixels where pixels may be shifted to their appropriate positions in the array to perform calculations for pixels near the border prior to performing calculations for the next row of pixels. Options for finishing one row and beginning another include, shifting the pixels in the array 1210 to assume their correct positions for calculations for pixel locations near the right border of the array without introducing new columns of pixels that would be outside of the border, or entering new columns of pixels that are offset by one row and shifting them into the array as calculations are completed for pixels near the border of the previous row. In this case, columns of pixel values shifted in to initialize portions of the array 1210 for calculations for pixel locations in the next row are not accessed until calculations for pixel locations in the current row are complete and calculations for pixel locations in the next row for which they are properly aligned are begun. Then when calculations for pixel locations in the next row begin, pixels in columns at the start of the row will already be in the array 1210 and calculations for pixel locations in this new row may be initiated and pixels remaining in the array from calculations for pixel locations in the previous row should not be accessed for calculations for pixels near the border in the new row. When pixel row buffer 4 expands to fill all of row 1205 and pixel row buffer 0 shrinks to zero and ceases to exist, the row buffer numbering as depicted is all decremented by one at the start of the new row and pixel row buffer 4 in row 1205 becomes the new pixel row buffer 3 and pixel row buffer 1 in row 1206 now becomes the new pixel row buffer 0 and pixels are added to a newly formed pixel row buffer 4 at the start of row 1206. Thus, the row buffer locations associated with given rows in array 1210 advance cyclically by one row in row buffer array 1230 and this advance results from the incremental advance in rows in the image used for calculations related to pixels in successive rows of the image and data in row buffer 1230 is not moved but the row to which new pixel values are written overwriting the oldest pixel value advances cyclically through the array. For processing successive rows of image data, the row with the dual partial buffer interface progresses to the last row 1208 of the buffer array 1230 and then cycles back to row 1205 of the cyclic array.

The description here for buffer array 1230 and its associated calculation supporting array 1210 may be applied to row buffer array 1232 and the associated tone bilateral filter calculation supporting array 1227. In this case, the same kind of control to restrict access to values in the array 1227 that are outside of the image border or replace these values with zero or with another value appropriate to the calculation may be implemented to provide the same options in transitioning from one row to the next as are provided for the color interpolation calculations associated with buffer array 1230.

Figure 13:
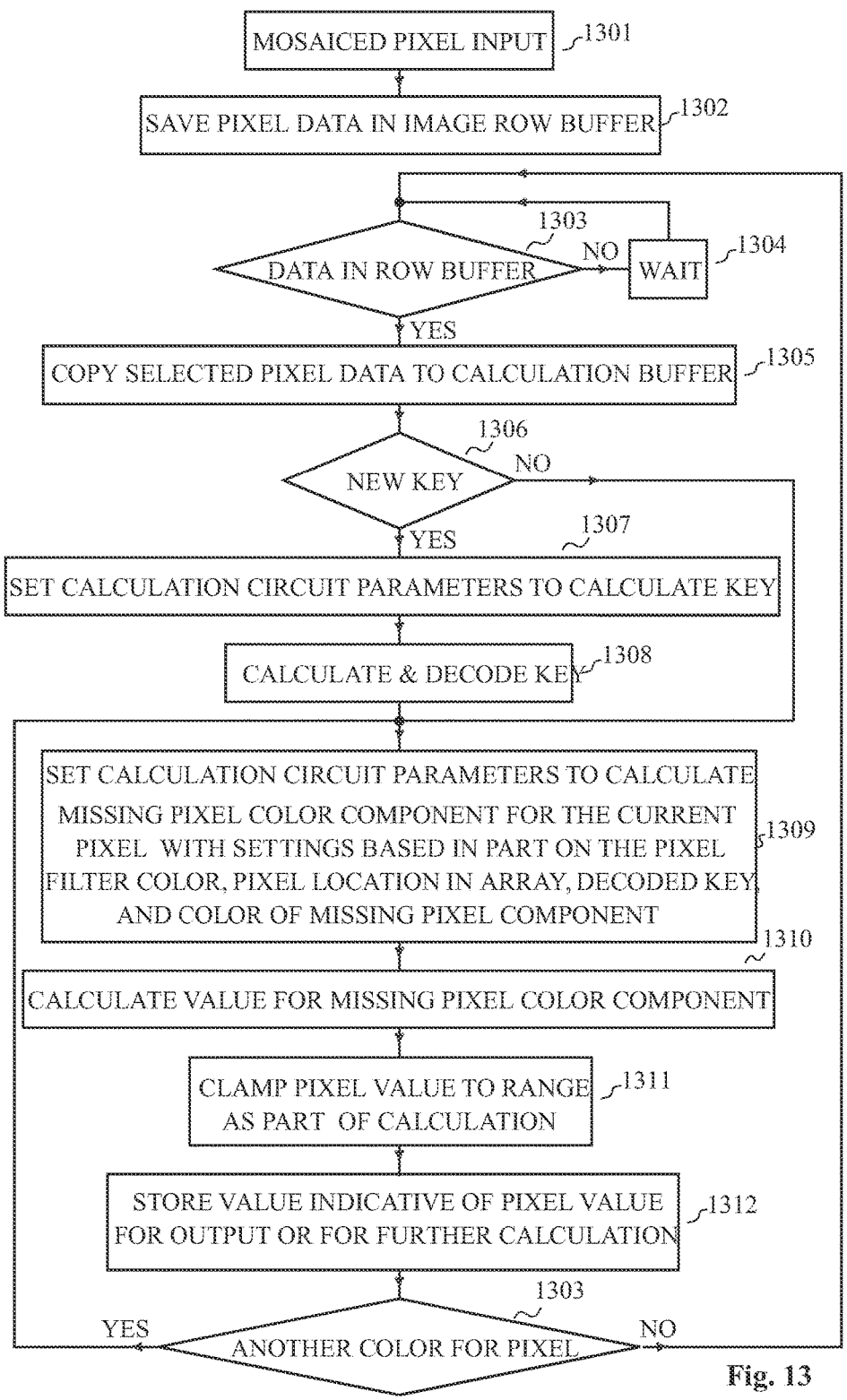
FIG. 13 depicts a simplified flow diagram of the operation of a device configured to accept data associated with a digital image having missing color data for each pixel.

FIG. 13 is a simplified flow diagram of the operation of a device configured to accept an image with missing color components and provide the missing color components. For example, when Bayer filter patterns are used, only one of the three color components is normally supplied at each pixel location and the device preferably supplies pixel values for each of the two missing components for each pixel in the image. Pixels are input as indicated in block 1301 from an image source such as an imager having a Bayer filter array to provide one color component for each pixel location. In a preferred embodiment, missing pixel values are provided for each of the two missing color components based on calculations that use pixel data from a five row by five column supporting array of input pixel values with calculations made for the pixel that is centered in this supporting array. Pixel data is stored in a buffer as indicated in block 1302 after optional format conversion and conditioning that may include but is not limited to color correction. The decision block 1303 and delay block 1304 operate together to delay transfer of data to the calculation buffer as indicated in block 1305 until it is available in the row buffer as indicated in block 1302. When the data is available, it is copied, preferably a column of values at a time, to the calculation buffer as indicated in block 1305 and when data is available in the buffer to support the calculation for another pixel, control is passed to decision block 1306 where a check is made to see if a new key should be calculated. If a new key is needed, it is calculated and otherwise its calculation is bypassed. As indicated in the more detailed description of a preferred circuit, a value for the key is calculated based on pixels in a neighborhood of the pixel or pixels for which missing color components are being supplied. The calculation circuit is configured to calculate the key as indicated in block 1307 and the key is decoded in block 1308 to provide an indication of the presence of edges along with their orientation and this information is used in selecting an appropriate conversion algorithm or conversion circuit configuration to provide missing color components for each of the pixels for which a particular key is used. Optionally, the pattern indicated by the key may be interpreted differently for the individual pixel locations for which it is applied and/or may be used to detect the presence and orientation of features other than or in addition to edges. The calculation circuit is configured to calculate the value of a missing color component for the pixel for the pixel location currently centered in the supporting array of pixel values as indicated in block 1309. The calculation algorithm chosen and executed in a dedicated circuit as indicated here or optionally as a routine in a software program is based on a number of factors that may include, but are not limited to, the color of the missing color component being calculated, the color of the Bayer filter for the current pixel for which the calculation is being performed, the location of the filter color for the current pixel relative to other filter colors in the color filter pattern, the proximity of the current pixel to a boundary of the image, the decoded value of the key for the current pixel. After configuring the calculation circuit or optionally selecting an appropriate calculation routine based at least in part on factors indicated above, a calculation is performed to provide an intermediate value for the missing color component. The intermediate value may be negative or may exceed a range provided for the pixel value. In block 1311, the intermediate value is clamped to the accepted pixel output range to provide the value for the missing color component that is stored in a buffer for output or for further processing that may include color correction as indicated in block 1312. There are normally two color components to provide for each pixel and in decision block 1303 a determination is made as to whether there is another color component to provide for the pixel in which case control is passed to block 1309 and if all of the color components have been provided for the current pixel, control is passed to block 1303 to service the next pixel.

In the circuit depicted in FIGS. 8 and 8A, selection of the circuit configuration to calculate one or more missing color components for a given pixel or pixels is based in substantial part on pattern detection performed for a preselected array of pixels that preferably have green filters in the color filter array. The preselected array of pixels is used as the base for a pattern image and is referred to as the pattern array. Values that are preferably binary (either one or zero) are calculated for individual pixels in the pattern array preferably based on comparisons of values of the individual pixels in the pattern array to a threshold value. The single bit binary values of the compare outputs are referred to as pattern values and the image formed by pixels that are given the pattern values and arranged to generally match the geometric layout of the pattern array will be referred to as the pattern image. Pattern values in the pattern image are sampled and analyzed to detect patterns in the pattern image that correspond to patterns such as edges and edge orientations in the original pixel values recorded in the image. In the circuit of FIG. 8, the circuit that is selectively configured to calculate the various interpolated values is shared to calculate the average of the values of the pixels in the preselected pattern array. Then a pattern image is formed by, for example, assigning a pattern value of one to pixels in the pattern image that correspond to pixels in the array whose values are approximately greater than the average and assigning a pattern value of zero to pixels in the pattern image that correspond to pixels in the array whose values are approximately less than the average. In the circuit of FIG. 8, a key is generated from the binary pattern values and used as an index into a table or as an input to a logic circuit to select or to generate a value that is indicative of the circuit configuration that is appropriate for the interpolation operation. In the circuit of FIG. 8, register 831 holds the average value that is compared in compare circuits 816 against pixel values from pixels in the preselected pattern array and the binary outputs of the compare circuits provide the binary values for the pattern image that is generated. In block 817, these binary compare values are arranged in a predetermined sequence to provide a key that is indicative of the pattern image pixel values and in block 829 the key is decoded to provide an indication of the circuit configuration appropriate for the pattern image. In preferred configurations, the patterns that are detected in the pattern image include those that indicate the presence and the orientation of approximately horizontal and approximately vertical edges in the pattern image. Optionally, diagonal edge features or other features the pattern image may also be detected. As an example, these other features may include detection both of edges that span greater distances and ones that span shorter distances and the shorter and longer edges may be treated either as a common or as discrete patterns.

The circuit of FIG. 8 that uses the average as the compare threshold for the pattern performs well and the threshold provided by the average adapts well to both very brightly and very dimly lighted areas in an image as well as to midrange lighting conditions so that use of the average is one of the preferred ways to provide the threshold level used to generate the pattern image. One limitation of the average as the base for the one/zero classification of pixels in the pattern image is that when the pixels in the pattern array includes both very dim and very bright pixels, the average may be skewed in a way that provides too few or too many ones or zeros in the pattern image to make it as useful as it might otherwise be to provide an indication of patterns that are present. More generally, compare threshold levels that provide other balances in the relative number of ones and zeros in the pattern image than that provided by using the average may reveal patterns in the image that are missed in the single pattern image provided by the circuit using the average value of the pixels in the pattern array as just described. Carrying this one step further, it is preferable to select compare thresholds to generate a set of different pattern images that include ones with differing numbers of ones or of zeroes, for pixels in the pattern image (at least for those not containing pixels of equal value).

Figure 14:
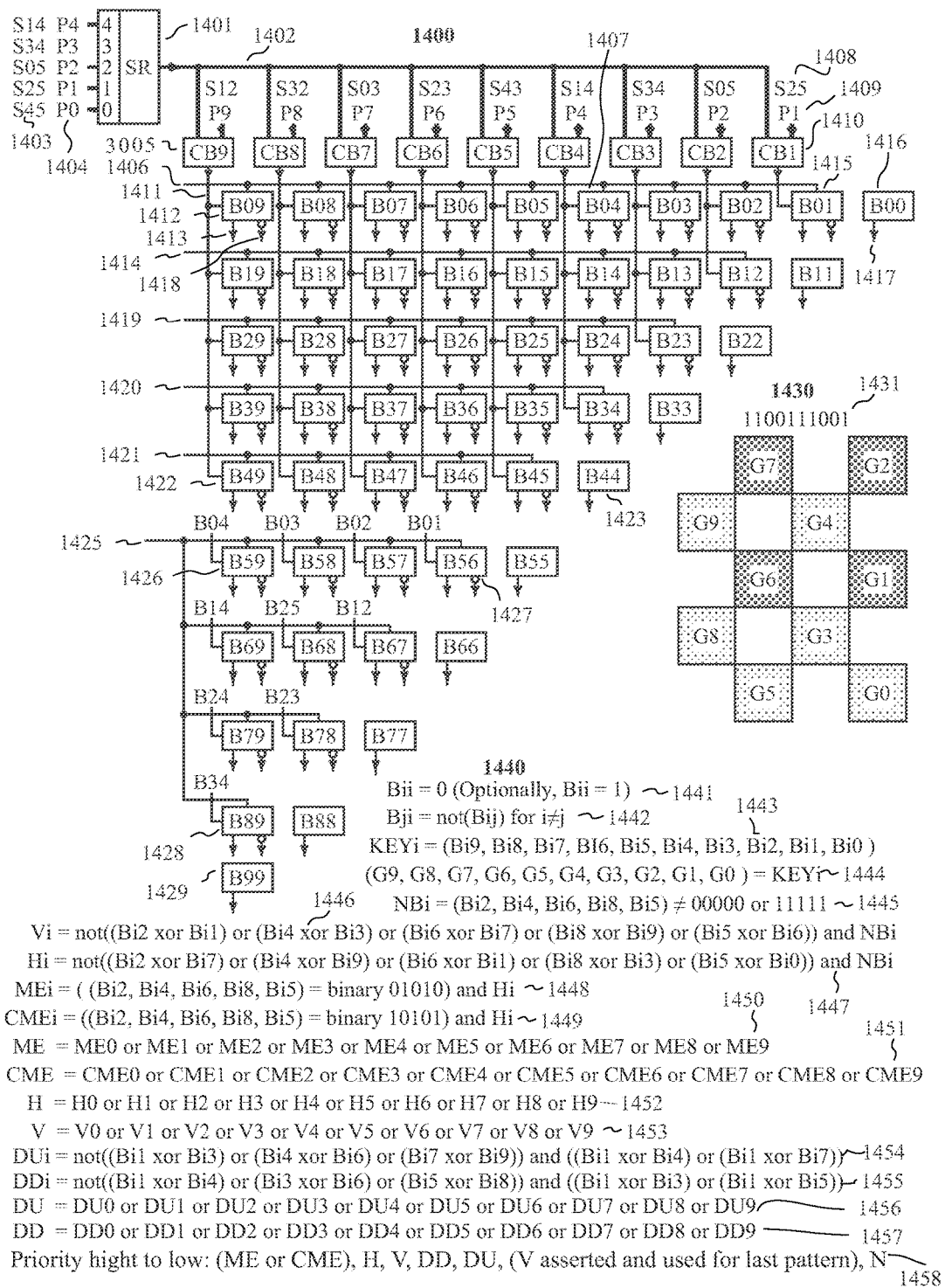
FIG. 14 depicts a simplified schematic of a preferred embodiment of the present invention implementing a multi-pattern based algorithm.

In an alternate embodiment depicted in FIGS. 7A, 8A, 9A and 14 and preferred for color interpolation for very high dynamic range images, most of the circuit of FIG. 8 is retained but instead of providing the average 831, compare circuits 816 are reconfigured and preferably used multiple times to provide a structured indication of results of compares of brightness of pixels in the pattern array relative to one another. The compare circuits shown as CB1 1410 through CB9 1405 in FIG. 14 are depicted as 842A in FIG. 8A. Blocks 842A, 843A, 844A, 845A, and 846A denoted in dashed line box 841A in FIG. 8A correspond generally to the more detailed representation in FIG. 14. Compare result storage elements B01 1415 through B89 1428 provide the comparison result matrix 843A. Pixel array 1431 in combination with values stored in 1400 and pattern detection logic provided by logic expressions in block 1440 provide the base for the multiple patterns detected on the multiple pattern images in block 844A of FIG. 8A. Logic equations for ME, CME, H, V, DD and the prioritizing indication 1458 provide the detail for combining and prioritizing the pattern results to provide information to make a pattern selection in blocks 845A and 846A. The compare indications from CB1 through CB9 that indicate the results of comparisons, one to another, of pixel values in the pattern array are used directly, preferably without additional compares, to generate multiple pattern images for the pattern array and these pattern images or their associated key values are preferably used to at least in part select or configure the calculation circuit to provide the interpolated color values. In a preferred embodiment, the pixel value selected as a reference pixel in the pattern array is used in a manner similar to put in place of the average used in FIG. 8 and compared against other pixel values in the pattern array to generate a set of binary values that indicate how the brightness of the selected pixel compares with the brightnesses of other pixels in the pattern array. For comparison of pixel 'a' against pixel 'b', the compare value for comparison of pixel 'b' against pixel 'a' may be inferred as the logical complement of the result of a comparison made when the comparison order is reversed. In paragraphs that follow, the term reference pixel will be used to convey meaning of the pixel in the pattern array whose value is used as the reference value for comparison for a particular subset of results preferably obtained as a direct or as an inferred comparison. The results of the compares are preferably encoded so that a pixel in the pattern image is assigned a pattern value of one if its intensity is approximately greater than the selected reference pixel and a pattern value of zero otherwise. Similar compares are preferably performed using other (preferably all other) pixels in the pattern array as the reference pixel and these other pixels are preferably selected one by one in sequence as the reference pixel so that a set of results for comparisons of pairs of pixel values for pixels in the pattern array is generated. The array of comparison values constructed as just indicated is preferably arranged to provide data that corresponds to separate pattern images with each pattern image associated with the pixel in the pattern array that was used as the reference pixel to generate the pattern image. It is preferable to limit the number of comparisons that are made by assuming that the result of comparing pixel "a" against pixel "b" is the logical complement of comparing pixel "b" against pixel "a" as indicated above. When all of the pixels in the pattern array are included as reference pixels either through direct or implicit comparisons so that compare results for all pairs of pixels in the pattern array are included, these results provide information needed to generate a pattern image and its key for each pixel in the pattern array as it is used as the reference pixel with ones assigned to pixels that are approximately greater in brightness than the associated reference pixel and zeros assigned to pixels whose brightness is approximately less than that of the associated reference pixel. The reference pattern image value associated with the reference pixel may be assigned a pattern value of either a zero or one, but it is preferable to establish a uniform convention and to use one or the other assignment consistently. If the reference pixel is assigned an associated pattern value of zero there will be no pattern images that are all ones and if the reference pixel is assigned an associated pattern value of one there will be no pattern images that are all zeros. But, in either case, for n pixels in the reference array there will a pattern image that contains exactly one one, another that contains exactly two ones, etc. through a pattern image that contains exactly n–1 ones. Another way of stating this is that the set of reference images generated will be constructed so that for a reference image having n pixels, each of the n pixels is used as a reference pixel to generate an associated pattern image. Then in this set of n pattern images, when none of the pixel values in the pattern array are equal, there is one that has exactly r pixels that have a pattern value of one for every integral value of r between and including 1 and n–1. Thus, all of the pattern images generated by segregating the reference image into non-empty groups of larger and smaller pixel values and assigning a pattern image value of one to the pixels with the larger values and a pattern image value of zero to the pixels with the smaller values are provided. In the circuit description, some of the statements are logically correct only when all pixels in the pattern array have discrete values that are when none of the pixels in the pattern array have equal values. In the circuit implementation, the circuit would be considerably complicated if the cases of equal pixel values were detected and treated as special cases. Furthermore, when pixel values are equal or nearly equal, the choice of the circuit used for the interpolation does not normally change results that much. Additionally, slight noise would easily alter the equality status anyhow making it prudent to sidestep the complicating issues presented when equal values are treated as special cases. The circuit is preferably configured so that approximations introduced to avoid handling equal pixel values as special cases do not lead to circuit malfunction or to highly objectionable results. Provision of a consistent bias in treatment of comparison results for equal pixel values is one way to reduce the number of logical flaws that might otherwise propagate into objectionable circuit behavior. In the example, a compare value of one is assigned when the value of the pixel compared against a selected reference pixel is greater than the selected reference pixel and a compare value of zero is assigned otherwise. This is consistent with presuming a bias that when a pixel of equal value is compared against the selected reference pixel, it will be assigned a value of zero. In the pattern images that are generated, there is an implied self comparison of the selected pixel against itself and this is preferably also assigned a value of zero when the compare criterion just indicated is used. If the compare criterion to which a one is assigned is changed from greater than to greater than or equal to (i.e. not less than); then, the implied self comparison values are preferably assigned a value of one to be self consistent. In certain alternate designs, the assigned compare values of one and zero may be reversed since the configuration of the interpolation circuit may in most cases be the same for a pattern images and its negative or complementary pattern image. When such a reversal is used, care should be taken to properly handle special cases that do depend on high or low intensity or that for various other reasons might not be transparent to the one/zero inversion. One such example, as explained elsewhere, is that of patterns from portions of an image with multiple edges spaced approximately one pixel width apart. In the description of the circuit in FIG. 14, it is presumed that pixels in the pattern array have discrete values and that features such as those just described are provided to prevent or at least limit undesirable performance when equal pixel values are encountered. The statements above are not intended to limit the scope of the invention but to provide a preferred option to simplify the circuit by structuring it to operate satisfactorily without treating all cases when pixel values are equal as special ones.

In FIG. 14, G0 through G9 are used to indicate pixel locations or associated pattern values of pixels that preferably have green filters in the color filter array and which are preferably positioned as indicated by the array 1430. The actual respective values of these pixels are indicated by P0 through P9, respectively. 1431 indicates the key constructed according to equation 1443 associated with the pattern image 1430. The data paths for these values and for the selected pixel value of one of the pixels P0 through P4 1404 at 1402 are preferably wide enough to provide full width data paths for transmission of the pixel values.

The tags S12, S32, S03, S23, S43, S14, S34, S05, S25 and S45 indicate storage registers in FIG. 8A that are preferably connected to the respective inputs P9, P8, P7, P6, P5, P4, P3, P2, P1, and P0 when the circuit 1400 of FIG. 14 is included in the circuit of FIG. 8A. Pixel array 1430 indicates the location of pattern array pixels G0 through G9 in the imaging array. These pixels are preferably ones with green filters in the color filter array, and the imaging array is preferably used when interpolated pixel values are calculated for the pixel location at G6 and for the neighboring non-green pixel location between G1 and G6. Select circuit 1401 responds to a select control signal, not shown in the simplified logic diagram, to place the selected one of pixel values P0, P1, P2, P3, or P4 on bus 1402 thereby routing the selected pixel value to the inputs of compare circuits CB1 (1410) through CB9 (1405) where the pixel values of P1 through P9, respectively, are compared against the selected value that is used as the reference pixel value. Each compare circuit preferably outputs a one-bit compare value. The output of CB9 1405 is asserted on column line 1411 and may be stored in the storage flip-flop: B09 1412 by asserting storage enable line 1406, B19 by asserting storage enable line 1414, B29 by asserting storage enable line 1419, B39 by asserting storage enable line 1420 or B49 1422 by asserting storage enable line 1421. Values from compare circuits CB8 through CB1 that have storage flip-flops in the same row are saved along with the output from CB9 when a storage enable signal is asserted. Output 1413 is the non-complemented output and 1418 is the complemented output of storage flip-flop (or memory cell) B09. Complemented output 1413 is included because it represents the value of the transpose term B90 that is not provided as a separate storage register because it would be a duplication of the information provided by B09. Particularly for the copy used to obtain the ten compare results beginning with B59 1426 in row 5 and including locations in this row and in succeeding rows through B89 1428 in row 8, these values would need extra logic to acquire the extra transpose terms at the time that the copied over values were acquired. For each of the ten diagonal terms B00 through B99, the first and second numerical digits in the name are equal, and these terms each imply a self comparison of the reference pixel against itself and are preferably either all zero or all one as explained above. The complement outputs and the constant diagonal terms are included for completeness in the description and it is presumed that they may be optimized out in an actual logic implementation. Storage of compare results in rows 4 through 0 (terms B4j through B0j for terms in column j of each row 4 through 0) is synchronized with selection of P4 through P0 so that the Bij term represents the result of comparing pattern array pixel value Pj against pattern array reference pixel value Pi for i and j taking on values 0 through 9. The outputs of the complement (Bji) of Bij provide values for term Bji that serve to fill in the missing terms in the triangular matrix to provide values for a full 10 by 10 matrix. The 10 values of B00 through B09 then provide the pattern image pixel values when P0 is the reference pixel and in general for completed 10 element row i Bi0 through Bi9 provide the pattern image pixel values when Pi is the reference pixel. In the example in FIG. 14, columns of pixel values in the array used as the base for calculation of the interpolated values are shifted to the left as interpolated values are provided for each pixel location and the operations indicated in association with FIG. 14 are performed with the pixels in a single location. This is explained in more detail in the description of FIG. 8A. Additionally, it is presumed that the calculation to be described in association with FIG. 14 was previously performed two pixel location increments earlier when the pixel value that is now in G5 was in G0, the pixel value that is now in G6 was in G1, the pixel value that is now in G7 was in G2, the pixel value that is now in G8 was in G3, and the pixel value that is now in G9 was in G4. Because of the serial sequence, corresponding values calculated for interpolation at the proceeding preceding pixel or pixels for B01, B02, B03, B04, B12, B13, B14, B23, B24, and B34 are still valid but now apply to corresponding pixels as indicated above so they are copied to B56, B57, B58, B59, B67, B68, B69, B78, B79, and B89, respectively, by asserting a store enable signal at 1425. Following this, while pixel values at P0 through P9 are stable, select circuit 1401 is configured by signals not shown in the simplified circuit to select signals P4, P3, P2, P1, and P0 in sequence and gate the selected pixel value to bus 1402 where it is input to compare circuits CB9 1405 through CB1 1410 and compare values are saved in appropriate rows of the triangular matrix as described above.

Logic expressions 1440 are preferably implemented in logic circuits to provide pattern recognition that is based on patterns detected in one or more of the pattern images constructed from the comparison results saved in memory cells Bij in circuit 1400. Equation 1441 is a statement of the fact that self compare values are 0 (or optionally 1 depending on the compare criteria). Equation 1442 indicates that the comparison of "b" to "a" is the logical complement of the comparison of "a" to "b" and is used to fill out the rows to 10 elements each for the triangular array in circuit 1400. The expression 1443 provides ten sets of values for KEYi for values of ranging from 0 to 9. KEYi is an ordered list of the values in the $i^{th}$ row of the array of values provided by circuit 1400 and completed using equation 1442. Ten pattern images are provided by setting the ten pattern array values G9 through G0 1430 equal to corresponding values in KEYi as indicated at 1444. NBi 1445 is zero or false when Bi2, Bi4, Bi6, Bi8 and Bi5 are all zero or all one and is used to screen out blank full zero or full one patterns for Vi and Hi. A vertical pattern Vi 1446 for the pattern image associated with the $i^{th}$ row is asserted when the five pairs of values (Bi2, Bi1), (Bi4, Bi3), (Bi6, Bi7), (Bi8, Bi9), and (Bi5, Bi6), each pair having elements from the same column, are all matching pairs as indicated by exclusive or values of zero and the matching pairs are not all zero (or all one) as indicated by a nonzero, true, value of NBi. For the vertical patterns, there are two columns in the pattern array that contain 3 elements. To demonstrate that there are options in defining the patterns, the pairs (Bi6, Bi7) and (Bi5, Bi6) are both matched against each other so that all three elements G5, G6, and G7 must match for the vertical pattern detection Vi to be asserted while G0 is not included at all in the vertical pattern criterion. Many other options for pattern recognition may be used to practice the invention. A horizontal pattern Hi 1447 for the pattern image associated with the $i^{th}$ row is asserted when the five pairs of values (Bi2, Bi7), (Bi4, Bi9), (Bi6, Bi1), (Bi8, Bi3), and (Bi5, Bi0), each pair having elements from the same row, are all matching pairs as indicated by exclusive or values of zero and the matching pairs are not all zero (or all one) as indicated by a nonzero, true, value of NBi. In the example, the elements Bi2, Bi4, Bi6, Bi8 and Bi5 are each elements of different pairs both for the expression Vi used to indicate the vertical pattern match and for the expression Hi used to indicate the horizontal pattern match. Additionally, because the match indicates equality of members of each of the individual pairs, the values of all 10 of the elements may be inferred from the five values Bi2, Bi4, Bi6, Bi8 and Bi5 when a horizontal match Hi is asserted and the values of the nine elements G1 through G9 may be inferred by the five values Bi2, Bi4, Bi6, Bi8 and Bi5 when a vertical match Vi is asserted. Use of the smaller subset of elements Bi2, Bi4, Bi6, Bi8 and Bi5 to detect the full one pattern, the full zero pattern and the multiple edge patterns MEi and complementary multiple edge pattern CMEi using this subset of pixels results in a substantial saving in the logic circuits needed to detect and distinguish patterns of interest. Another way of stating this is that a pattern detection circuit is simplified by preferably choosing single representatives from each subset of elements where the elements in each of the subsets must match to fulfill a primary pattern matching condition. Then, for a pattern matching condition, the values of the representatives provide an indication of the values of the elements in the larger group of combined subsets. Matches of patterns in the group of representatives may then be used to categorize patterns that fulfill the primary pattern matching condition. The technique is preferably extended to more than one primary matching condition by arranging distinct subsets for each primary matching condition so that they share the same representatives for each of the primary matching conditions. Then tests for patterns within the set of representatives may apply to either or both of the primary patterns. This may be further extended to more than two primary patterns and/or may be applied only to portions of primary patterns.

The equations for MEi 1448 and CMEi 1449 employ the technique indicated above to provide simplified logic circuits to detect multiple edge patterns along with classification of these patterns into each of the two complementary forms as explained in association with FIGS. 6K, 6L, 10A, 10B, 10C, and 10D. The technique is also used to provide NBi 1445 that is used to provide simplified logic circuits for both the vertical pattern Vi matching and the horizontal pattern Hi matching to screen out all zero and/or all one pattern.

As a preferred option, logic circuits DUi 1454 and DDi 1455 are provided to detect edges that are oriented diagonally up or down, respectively, in going from left to right.

In a preferred embodiment, logic circuits are provided to determine NBi 1445, Vi 1446, Hi 1447, MEi 1448, CMEi 1449, DUi, and DDi for each value of i (0 through 9 in the example). The MEi terms are "or"ed together to provide an overall multiple edge pattern indication ME 1450. Similarly, CMEi terms are "or"ed together, Hi terms are "or"ed together, Vi terms are "or"ed together, DUi terms are "or"ed together, and DDi terms are "or"ed together, to provide CME 1451, H 1452, V 1453, DU 1456, and DD 1457, respectively. More than one pattern may be detected and it is preferable to assign a priority as indicated in the listing 1458 or optionally some other screening criteria to choose a result when multiple patterns are detected. In a preferred embodiment, ME (1st), CME, H, V, DD, and DU are given priority in that order so that a match occurring for the pattern with the highest priority is asserted and overrides any lower priority matches that may be asserted. The pattern array 1430 of this example includes pixels from five rows and four columns in the imaging array and there is advantage in including pattern features that extend over the entire or at least a larger part of the pattern array. Vertically oriented features are the most neglected in this respect. Because of the sequential processing of pixels in a row, it is possible to include results of previous, preferably the immediately previous set of pattern images as part of the pattern determination for the current pixel set. If no pattern features are detected in the current pattern set and if a vertical edge pattern was detected in the immediately previous pattern set, then a vertical edge pattern is used for this interpolation set also, but the vertical edge detection is preferably not propagated farther than from the immediately preceding edge detection to the next. Finally, if no edges are detected the nondirectional pattern N is preferably the default indication when no other pattern features are detected. In a preferred embodiment, the logic just indicated is implemented in a Xilinx Spartan 6 series FPGA. With the six inputs, 64 bit lookup table devices used to implement logic functions, the logic just described may be implemented with a reasonable number of programmable logic elements.

The pattern matching circuit just described performs a complex function that is similar to looking at the pixel values in the pattern array and beginning with a very high threshold as a reference value, lowering the threshold until one pixel is assigned a one in the pattern image and looking for a pattern in this pattern image and continuing this sequence, further lowering the threshold until two pixels are assigned a one in the pattern image and looking for a pattern in this pattern image and continuing this sequence until all but one pixels are assigned a one in the pattern image and looking for a pattern in this pattern image. In the preferred embodiment, by using values of pixels in the pattern array as references, calculations to find averages or medians, or use of multiple unnecessary repeated trials are avoided. Additionally, by using all of the pixels in the pattern array as reference pixels, all of the patterns, i.e. those with one one, two ones etc. through n−1 ones are provided. Since the pattern detection circuits effectively detect patterns in pattern images with any number of ones, it is not necessary to classify the patterns as to the number of ones in the pattern but only to look for patterns in all of the pattern images knowing that, for a pattern image with n pixels that have distinct values, patterns with one one through patterns with n−1 ones are all included. The surprising result has been that in implementations tried, it may require less hardware to implement pattern detection than to count ones in an image and to port pattern images with predetermined numbers of ones to an appropriate pattern recognition circuit.

Logic may be provided to detect additional patterns such as diagonal edges. The description has focused on provision of edge and feature detection used to select interpolation equations or calculation circuits or routines to supply missing color values for images acquired using a color filter array. The circuit is not limited to this function and may be adapted to other tasks such as image based feature extraction that might, for example, be used to detect horizontally separated pairs of lights such as distant taillamps or headlamps for a headlamp dimmer control application. One application of such feature extraction beyond simple location of the features in the image would be to respond to probable headlamps and taillamps (detected as close spaced but horizontally separated light sources) to select specialized color interpolation routines to improve the color interpolation, since, particularly for taillamps, color is an important distinguishing feature. One way that this could be used is to cross sample or average color components detected at the pair of lamps and because of their separation improve the accuracy of the interpolated color values that are provided. Locations in the image might also be tabulated to facilitate further image processing.

Patterns that are of interest each have a certain number or numbers of ones and zeros and the patterns will show up only in pattern images with the corresponding number or one of the corresponding numbers of ones and zeros. Pixel values need to be ordered to know how many ones and zeros each will yield when used as a reference pixel to generate a pattern image with a known number of ones and zeros. Several patterns with different numbers of ones and zeros are needed to detect all of the patterns of interest. For a pattern image with n pixels it is preferable to generate patterns with every possible number of ones between 1 and n−1 and analyze each for possible patterns. By including and searching all of the pattern images of interest, one may be assumed that all appropriate patterns will be included in the composite results. This assurance may be given without knowing the number of ones and zeros in specific patterns only when all pattern images of interest are included.

It should be understood that the above detail description is provided for enabling one of ordinary skill in the art to make and use the invention as recited in the appending claims. In no way should this description be interpreted as limiting the scope of the invention to any given embodiment, therefore, the appending claims are intended to include all equivalent structure and equivalent function within the respective scope.

What is claimed is:

1. An image processing apparatus, comprising:
a processing circuit for:
receiving an image obtained using a mosaiced spectral filter having red, green, and blue filtered pixels,
determining a direction of an edge feature in the image using only the color values in the received image that correspond to like-color filtered pixels,
calculating a missing color value for at least one pixel location in the image using an interpolation equation that is selected based on the direction of the edge feature in the image, wherein the selected interpolation equation generates a plurality of product term multipliers, wherein said interpolation equation multiplies color values of neighboring pixels of the pixel location by the product term multipliers, and wherein the only product term multipliers are each an integral power of 2, and
converting the received image into an output image including the missing color value for the at least one pixel location.

2. The image processing apparatus of claim 1, wherein the like-color filtered pixels are green filtered pixels.

3. The image processing apparatus of claim 1, wherein said missing color value is associated with a red filtered pixel, and wherein green and blue color values are calculated.

4. The image processing apparatus of claim 1, wherein said missing color value is associated with a green filtered pixel, and wherein red and blue color values are calculated.

5. The image processing apparatus of claim 1, wherein said missing color value is associated with a blue filtered pixel, and wherein red and green color values are calculated.

6. The image processing apparatus of claim 1, wherein said processing circuit is configured to receive data associated with a first series of spectrally mosaiced, high dynamic range, digital images from an imaging device and output a second series of digital images having missing color data imputed.

7. The image processing apparatus of claim 6, wherein data associated with said first series of spectrally mosaiced, high dynamic range, digital images is received at a rate greater than, or equal to, twenty-five images per second.

8. The image processing apparatus of claim 6, wherein data associated with a second series of spectrally demosaiced, high dynamic range, digital images is output at a rate greater than, or equal to, twenty-five frames per second.

9. An image processing apparatus, comprising:
a processing circuit for:
receiving an image obtained using a mosaiced spectral filter having red, green, and blue filtered pixels,
calculating a missing color value for at least one pixel location in the received image using a selected interpolation equation, the selected interpolation equation generates a plurality of product term multipliers, wherein said interpolation equation multiplies color values of neighboring pixels of the pixel location by the product term multipliers, and wherein the only product term multipliers are each an integral power of 2, and
converting the received image into an output image including the missing color value for the at least one pixel location.

10. The image processing apparatus of claim 9, wherein said processing circuit detects features in the image that are at least in part used to determine selection of the interpolation equation.

11. The image processing apparatus of claim 9, wherein said processing circuit is further configured to select the interpolation equation based at least in part on detected patterns in said the image.

12. The image processing apparatus of claim 9, wherein said missing color value is associated with a red filtered pixel, and wherein green and blue color values are calculated.

13. The image processing apparatus of claim 9, wherein said missing color value is associated with a green filtered pixel, and wherein red and blue color values are calculated.

14. The image processing apparatus of claim 9, wherein said missing color value is associated with a blue filtered pixel, and wherein red and green color values are calculated.

15. The image processing apparatus of claim 9, wherein said processing circuit is configured to receive data associated with a first series of spectrally mosaiced, high dynamic range, digital images from an imaging device and output a second series of digital images having missing color data imputed.

16. The image processing apparatus of claim 15, wherein data associated with said first series of spectrally mosaiced, high dynamic range, digital images is received at a rate greater than, or equal to, twenty-five images per second.

17. The image processing apparatus of claim 15, wherein data associated with a second series of spectrally demosaiced, high dynamic range, digital images is output at a rate greater than, or equal to, twenty-five frames per second.

18. The image processing apparatus of claim 9, wherein the product term multipliers do not include $2^0$.

19. The image processing apparatus of claim 9, wherein the product term multipliers are selected from the group consisting of: 1, 2, 4, 8, and 16.

20. The image processing apparatus of claim 9, wherein the product term multipliers are selected from the group consisting of: 2, 4, 8, and 16.

21. The image processing apparatus of claim 1, wherein the product term multipliers do not include $2^0$.

22. The image processing apparatus of claim 1, wherein the product term multipliers are selected from the group consisting of: 1, 2, 4, 8, and 16.

23. The image processing apparatus of claim 1, wherein the product term multipliers are selected from the group consisting of: 2, 4, 8, and 16.

* * * * *